United States Patent
Qiang et al.

(10) Patent No.: US 11,271,623 B2
(45) Date of Patent: Mar. 8, 2022

(54) CODEBOOK DESIGN FOR VIRTUALIZED ACTIVE ANTENNA SYSTEM (AAS)

(71) Applicant: Telefonaktiebolaget LM Ericsson (publ), Stockholm (SE)

(72) Inventors: Yongquan Qiang, Ottawa (CA); Girum Fantaye, Ottawa (CA); Jianguo Long, Kanata (CA); Hong Ren, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 16/757,489

(22) PCT Filed: Oct. 30, 2017

(86) PCT No.: PCT/IB2017/056729
§ 371 (c)(1),
(2) Date: Apr. 20, 2020

(87) PCT Pub. No.: WO2019/086926
PCT Pub. Date: May 9, 2019

(65) Prior Publication Data
US 2021/0036749 A1 Feb. 4, 2021

(51) Int. Cl.
*H04B 7/0456* (2017.01)
*H04B 7/06* (2006.01)
*H04L 5/00* (2006.01)

(52) U.S. Cl.
CPC ......... *H04B 7/0478* (2013.01); *H04B 7/0482* (2013.01); *H04B 7/0639* (2013.01); *H04L 5/005* (2013.01)

(58) Field of Classification Search
CPC .. H04B 7/0478; H04B 7/0482; H04B 7/0639; H04L 5/005
See application file for complete search history.

(56) References Cited

U.S. PATENT DOCUMENTS

2015/0326297 A1* 11/2015 Petersson ............. H04B 7/0617
370/329
2016/0149619 A1* 5/2016 Won ..................... H04B 7/0417
375/267
(Continued)

FOREIGN PATENT DOCUMENTS

EP          3316494 A1    5/2018
WO     2014198037 A1   12/2014
(Continued)

OTHER PUBLICATIONS

Author Unknown, "Technical Specification Group Radio Access Network; Evolved Universal Terrestrial Radio Access (E-UTRA); Physical channels and modulation (Release 14)," Technical Specification 36.211, Version 14.4.0, 3GPP Organizational Partners, Sep. 2017, 197 pages.
(Continued)

*Primary Examiner* — Jaison Joseph
(74) *Attorney, Agent, or Firm* — Sage Patent Group

(57) ABSTRACT

Systems and methods are disclosed herein that related to determining and using a codebook in a virtualized Active Antenna System (AAS). In some embodiments, a first radio node that is configured to communicate with a second radio node comprises a radio interface and processing circuitry configured to transform a first codebook that is in a non-virtualized antenna domain to a second codebook that is in a virtualized antenna domain based on a port to antenna mapping matrix used to transform a signal from the virtualized antenna domain to the non-virtualized antenna domain prior to transmission of the signal in a corresponding virtualized cell or sector. The processing circuitry is further configured to receive a transmit signal from the second radio node to thereby provide a received signal and perform Precoding Matrix Indication (PMI) estimation based on the
(Continued)

received signal using the second codebook in the virtualized antenna domain.

24 Claims, 18 Drawing Sheets

(56) References Cited

U.S. PATENT DOCUMENTS

| | | | |
|---|---|---|---|
| 2017/0041113 A1* | 2/2017 | Park | H04B 7/063 |
| 2017/0048863 A1* | 2/2017 | Tsai | H04W 76/27 |
| 2018/0063856 A1* | 3/2018 | Yang | H04B 7/0482 |
| 2018/0083681 A1* | 3/2018 | Faxer | H04B 7/0626 |
| 2018/0091272 A1* | 3/2018 | Wang | H04B 7/0626 |
| 2018/0278316 A1* | 9/2018 | Yang | H04B 7/0617 |
| 2019/0173538 A1* | 6/2019 | Wu | H04L 5/0048 |
| 2021/0006316 A1* | 1/2021 | Long | H04B 7/0632 |

FOREIGN PATENT DOCUMENTS

| | | |
|---|---|---|
| WO | 2017035686 A1 | 3/2017 |
| WO | 2017168351 A1 | 10/2017 |

OTHER PUBLICATIONS

Author Unknown, "Technical Specification Group Radio Access Network; Evolved Universal Terrestrial Radio Access (E-UTRA); Physical layer procedures (Release 14)," Technical Specification 36.213, Version 14.2.0, 3GPP Organizational Partners, Mar. 2017, 454 pages.

Invitation to Pay Additional Fees and Partial Search for International Patent Application No. PCT/IB2017/056729, dated Jul. 11, 2018, 15 pages.

International Search Report and Written Opinion for International Patent Application No. PCT/IB2017/056729, dated Sep. 4, 2018, 21 pages.

* cited by examiner

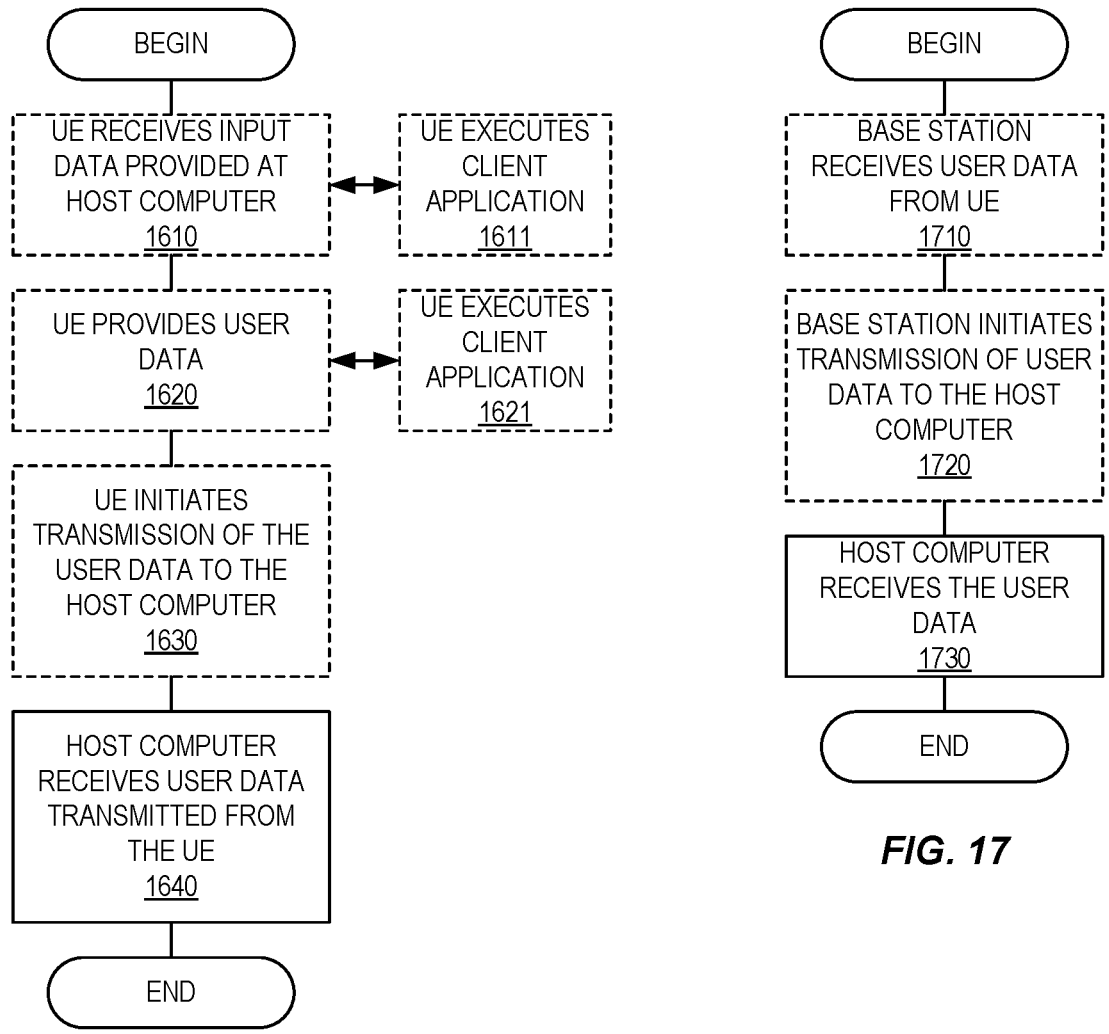

CODEBOOK DESIGN FOR VIRTUALIZED ACTIVE ANTENNA SYSTEM (AAS)

This application is a 35 U.S.C. § 371 national phase filing of International Application No. PCT/IB2017/056729, filed Oct. 30, 2017, the disclosure of which is incorporated herein by reference in its entirety.

TECHNICAL FIELD

The present disclosure relates to a virtualized Active Antenna System (AAS) and, in particular, to codebook design for a virtualized AAS.

BACKGROUND

Active Antenna System (AAS) is one of key technologies adopted by Fourth Generation (4G) Long Term Evolution (LTE) and Fifth Generation (5G) New Radio (NR) to enhance the wireless network performance and capacity by using Full Dimension Multiple Input Multiple Output (FD-MIMO) or massive MIMO. A typical AAS system consists of a two-dimensional antenna element array with M rows, N columns, and K polarizations (K=2 in case of cross-polarization) as shown in FIG. 1.

The AAS is usually used as virtual sectorization with a set of logical antenna ports by a port to antenna mapping matrix ($W_{p2a}$) as shown in FIG. 2. In the example of FIG. 2, there are two logical antenna ports in the virtualized antenna domain that are indexed by logical antenna port index m'. Further, in this example, the two logical antenna ports are mapped to eight physical antenna elements in the non-virtualized antenna domain that are indexed by physical antenna element index m. This mapping is provided by a port to antenna mapping matrix $W_{p2a}$. In this manner, the AAS with $N_t$ ($N_t$=M×N×K) antenna elements in the non-virtualized antenna domain are transformed to a virtualized AAS with $N_b$ ($N_b$=$M_v$×$N_v$×$K_v$) logical antenna ports or virtual beams. Typically, $N_b \leq N_t$.

One logical antenna port can be a composite of a number of antenna elements (e.g., one vertical column, one horizontal row, or combinations of both vertical and horizontal antenna elements, or cross polarizations), which is represented by each column of $W_{p2a}$. A logical antenna port represents an antenna port that is observed by a wireless device with beamformed Chanel State Information Reference Signal (CSI-RS), or a virtual beam that is processed by a baseband unit of, e.g., an enhanced or evolved Node B (eNB) or NR base station (gNB).

In a virtualized AAS, an input signal x is precoded using a precoding matrix W in a transformed space, which is referred to herein as the virtualized antenna domain. Then, the precoded signal (Wx) is mapped from the virtualized antenna domain to the non-virtualized antenna domain (i.e., mapped to the physical antenna elements) by a port to antenna mapping matrix $W_{p2a}$ as shown in FIG. 3. The AAS virtualization can be done in a Baseband Unit (BBU) of, e.g., an eNB or gNB, or in a Remote Radio Head (RRH).

Then, downlink precoding in a virtualized AAS can be modeled by:

$$y = H_{DL} W_{p2a} W x + n$$

where W is the precoding matrix in the virtualized antenna domain (i.e., in a logical antenna port or virtual beam space) with dimension of $N_b \times N_v$ where $N_v$ is the number of layers; $W_{p2a}$ is a $N_t \times N_b$ matrix used to transform the precoded signal from the non-virtualized antenna domain to the virtualized antenna domain or, in other words, map the $N_b$ logical antenna ports or virtual beams to the $N_t$ antenna elements; $H_{DL}$ is the downlink channel matrix for an un-virtualized AAS with dimension of $N_r \times N_t$; and $N_r$ is the number of receiving antennas at the wireless device side.

One of the key problems in a virtualized AAS is to design a cross-optimized precoding matrix W and port to antenna mapping matrix $W_{p2a}$, or optimum precoding matrix W with given port to antenna mapping matrix $W_{p2a}$.

SUMAMRY

Systems and methods are disclosed herein that related to determining and using a codebook in a virtualized Active Antenna System (AAS). In some embodiments, a first radio node that is configured to communicate with a second radio node comprises a radio interface and processing circuitry configured to transform a first codebook that is in a non-virtualized antenna domain to a second codebook that is in a virtualized antenna domain based on a port to antenna mapping matrix used to transform a signal from the virtualized antenna domain to the non-virtualized antenna domain prior to transmission of the signal in a corresponding virtualized cell or sector. The processing circuitry is further configured to receive a transmit signal from the second radio node to thereby provide a received signal and perform Precoding Matrix Indication (PMI) estimation based on the received signal using the second codebook in the virtualized antenna domain.

In some embodiments, in order to perform PMI estimation, the processing circuitry is further configured to transform the received signal from the non-virtualized antenna domain to the virtualized antenna domain based on the port to antenna mapping matrix to provide a virtualized antenna domain received signal and perform PMI estimation based on the virtualized antenna domain received signal.

In some embodiments, in order to transform the first codebook that is in the non-virtualized antenna domain to the second codebook that is in the virtualized antenna domain based on the port to antenna mapping matrix, the processing circuitry is further configured to transform the first codebook that is in the non-virtualized antenna domain to the second codebook that is in the virtualized antenna domain in accordance with:

$$B_b = f(B_a, W_{p2a})$$

where $B_b$ is the second codebook that is in the virtualized antenna domain, $B_a$ is the first codebook that is in the non-virtualized antenna domain, and $W_{p2a}$ is the port to antenna mapping matrix.

In some embodiments, in order to transform the first codebook that is in the non-virtualized antenna domain to the second codebook that is in the virtualized antenna domain based on the port to antenna mapping matrix, the processing circuitry is further configured to transform the first codebook that is in the non-virtualized antenna domain to the second codebook that is in the virtualized antenna domain in accordance with $B_b = (W_{p2a}^H W_{p2a})^{-1} W_{p2a}^H B_a$, $B_b = W_{p2a}^H B_a$, or $B_b = W_{p2a}^{-1} B_a$, where $B_b$ is the second codebook that is in the virtualized antenna domain, $B_a$ is the first codebook that is in the non-virtualized antenna domain, and $W_{p2a}$ is the port to antenna mapping matrix.

In some embodiments, the first radio node is a wireless device, the second radio node is a radio access node, and the port to antenna mapping matrix is used by the radio access node to transform the signal from the virtualized antenna domain to the non-virtualized antenna domain prior to transmission by the radio access node in the corresponding virtualized cell or sector. Further, in some embodiments, in order to perform PMI estimation based on the received signal using the second codebook in the virtualized antenna domain, the processing circuitry is further configured to select a precoding matrix from the second codebook, and the processing circuitry is further configured to report an indication of the precoding matrix to the second radio node. In some embodiments, in order to select the precoding matrix from the second codebook, the processing circuitry is further configured to select the precoding matrix from the second codebook in accordance with:

$$w_b = \operatorname*{argmax}_{w_b \in B_b} w_b^H R_b w_b$$

where $w_b$ is the selected precoding matrix, $B_b$ is the second codebook, $R_b$ is defined as $R_b = E[H_b^H H_b]$, $H_b$ is an effective downlink channel matrix for an effective downlink channel in the virtualized antenna domain observed by the wireless device with reference signal, where $H_b$ is defined as $H_b = H_{DL} W_{p2a}$, $H_{DL}$ is an actual downlink channel matrix that defines an actual downlink channel between the radio access node and the wireless device, and $W_{p2a}$ is the port to antenna mapping matrix.

In some embodiments, the first radio node is a radio access node, the second radio node is a wireless device, and the port to antenna mapping matrix is used by the radio access node to transform the reference signal from the virtualized antenna domain to the non-virtualized antenna domain prior to transmission by the radio access node in the corresponding virtualized cell or sector. Further, in some embodiments, in order to perform PMI estimation based on the received signal using the second codebook in the virtualized antenna domain, the processing circuitry is further configured to select a precoding matrix from the second codebook. In some embodiments, the processing circuitry is further configured to provide an indication of the precoding matrix to the second radio node. In some embodiments, in order to select the precoding matrix from the second codebook, the processing circuitry is further configured to select the precoding matrix from the second codebook in accordance with:

$$w_b = \operatorname*{argmax}_{w_b \in B_b} w_b^H R_b w_b$$

where $w_b$ is the selected precoding matrix, $B_b$ is the second codebook, $R_b$ is defined as $R_b = E[H_b^H H_b]$, $H_b$ is an effective downlink channel matrix in the virtualized antenna domain estimated by the first radio node, where $H_b$ is defined as $H_b = (W_{p2a}^T H_{UL})^T$, $H_{UL}$ is an actual uplink channel matrix in the non-virtualized antenna domain that defines an actual uplink channel between the radio access node and the wireless device, and $W_{p2a}$ is the port to antenna mapping matrix.

In some embodiments, the port to antenna mapping matrix is predefined for the corresponding virtualized cell or sector.

In some embodiments the first radio node is a wireless device, the second radio node is a radio access node, and the processing circuitry is further configured to select, at the first radio node, the port to antenna mapping matrix from a predefined set of possible port to antenna mapping matrices based on one or more precoded beam reference signals transmitted by the second radio node and send an indication of the port to antenna mapping matrix to the second radio node.

In some embodiments, the first radio node is a radio access node, the second radio node is a wireless device, and the processing circuitry is further configured to receive an indication of the port to antenna mapping matrix from the second radio node.

In some embodiments, the first radio node is a wireless device, the second radio node is a radio access node, and the processing circuitry is further configured to receive an indication of the port to antenna mapping matrix from the second radio node.

In some embodiments, the first radio node is a radio access node, the second radio node is a wireless device, and the processing circuitry is further configured to determine the port to antenna mapping matrix at the first radio node based on one or more uplink reference signals received from the second radio node and send an indication of the port to antenna mapping matrix to the second radio node.

In some embodiments, the first codebook that is in the non-virtualized antenna domain is defined as:

$$B_a = B_h \otimes B_v$$

where $B_h$ is a non-virtualized antenna domain codebook for a horizontal direction and $B_v$ is a non-virtualized antenna domain codebook for a vertical direction. In some embodiments, $B_h$ and $B_v$ are both Grid-of-Beam (GoB) codebooks.

In some embodiments, the first codebook that is in the non-virtualized antenna domain is defined as:

$$B_a = B_p \otimes B_h \otimes B_v$$

where $B_h$ is a non-virtualized antenna domain codebook for a horizontal direction, $B_v$ is a non-virtualized antenna domain codebook for a vertical direction, and $B_p$ is a non-virtualized antenna domain codebook for co-phasing cross polarizations. In some embodiments, $B_h$, $B_v$, and $B_p$ are GoB codebooks.

Embodiments of a communication system including a host computer are also disclosed. In some embodiments, a communication system includes a host computer comprising processing circuitry configured to provide user data and a communication interface configured to forward the user data to a cellular network for transmission to a User Equipment (UE), wherein the cellular network comprises a first radio node having a radio interface and processing circuitry, the processing circuitry of the first radio node configured to transform a first codebook that is in a non-virtualized antenna domain to a second codebook that is in a virtualized antenna domain based on a port to antenna mapping matrix used to transform a signal from the virtualized antenna domain to the non-virtualized antenna domain prior to transmission of the signal in a corresponding virtualized cell or sector, receive a transmit signal from a second radio node to thereby provide a received signal, and perform PMI estimation based on the received signal using the second codebook in the virtualized antenna domain.

In some embodiments, the first radio node is a base station and the second radio node is the UE. In some other embodiments, the first radio node is the UE and the second radio node is a base station.

In some embodiments, the communication system further includes the base station. In some embodiments, the communication system further includes the UE, wherein the UE is configured to communicate with the base station.

In some embodiments, the processing circuitry of the host computer is configured to execute a host application, thereby providing the user data, and the UE comprises processing circuitry configured to execute a client application associated with the host application.

Embodiments of a method of operation of a first radio node to perform PMI estimation in a wireless communication system are also disclosed. In some embodiments, a method of operation of a first radio node to perform PMI estimation in a wireless communication system comprises transforming a first codebook that is in a non-virtualized antenna domain to a second codebook that is in a virtualized antenna domain based on a port to antenna mapping matrix used to transform a signal from the virtualized antenna domain to the non-virtualized antenna domain prior to transmission of the signal in a corresponding virtualized cell or sector. The method further comprises receiving a transmit signal from a second radio node to thereby provide a received signal, and performing PMI estimation based on the received signal using the second codebook in the virtualized antenna domain.

Embodiments of a method implemented in a communication system including a host computer, a base station, and a UE are also disclosed. In some embodiments, a method implemented in a communication system including a host computer, a base station, and a UE comprises, at the host computer, providing user data. The method further comprises, at the host computer, initiating a transmission carrying the user data to the UE via a cellular network comprising the base station, wherein the base station transforms a first codebook that is in a non-virtualized antenna domain to a second codebook that is in a virtualized antenna domain based on a port to antenna mapping matrix used at the base station to transform a signal from the virtualized antenna domain to the non-virtualized antenna domain prior to transmission of the signal in a corresponding virtualized cell or sector, receives a transmit signal from the UE to thereby provide a received signal, and performs PMI estimation based on the received signal using the second codebook in the virtualized antenna domain.

In some embodiments, the method further comprises, at the base station, transmitting the user data. In some embodiments, the user data is provided at the host computer by executing a host application, and the method further comprises, at the UE, executing a client application associated with the host application.

In some embodiments, a method implemented in a communication system including a host computer, a base station, and a UE comprises, at the host computer, providing user data. The method further comprises, at the host computer, initiating a transmission carrying the user data to the UE via a cellular network comprising the base station, wherein the UE transforms a first codebook that is in a non-virtualized antenna domain to a second codebook that is in a virtualized antenna domain based on a port to antenna mapping matrix used at the base station to transform a signal from the virtualized antenna domain to the non-virtualized antenna domain prior to transmission of the signal in a corresponding virtualized cell or sector, receives a transmit signal from the base station to thereby provide a received signal, and performs PMI estimation based on the received signal using the second codebook in the virtualized antenna domain.

In some embodiments, the method further comprises, at the base station, transmitting the user data. In some embodiments, the user data is provided at the host computer by executing a host application, and the method further comprises, at the UE, executing a client application associated with the host application.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 16 is a flow chart that illustrates methods in a communication system including a host computer, a base station, and a UE in accordance with some embodiments;

FIG. 17 is a flow chart that illustrates methods in a communication system including a host computer, a base station, and a UE in accordance with some embodiments.

DETAILED DESCRIPTION

Figure 1:
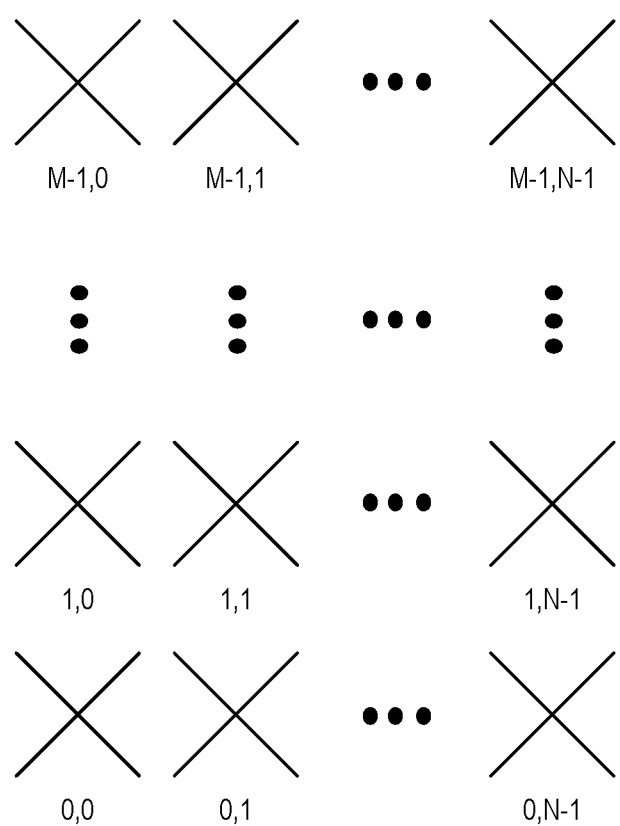
FIG. 1 is a diagram of a two-dimensional antenna element array.
Figure 2:
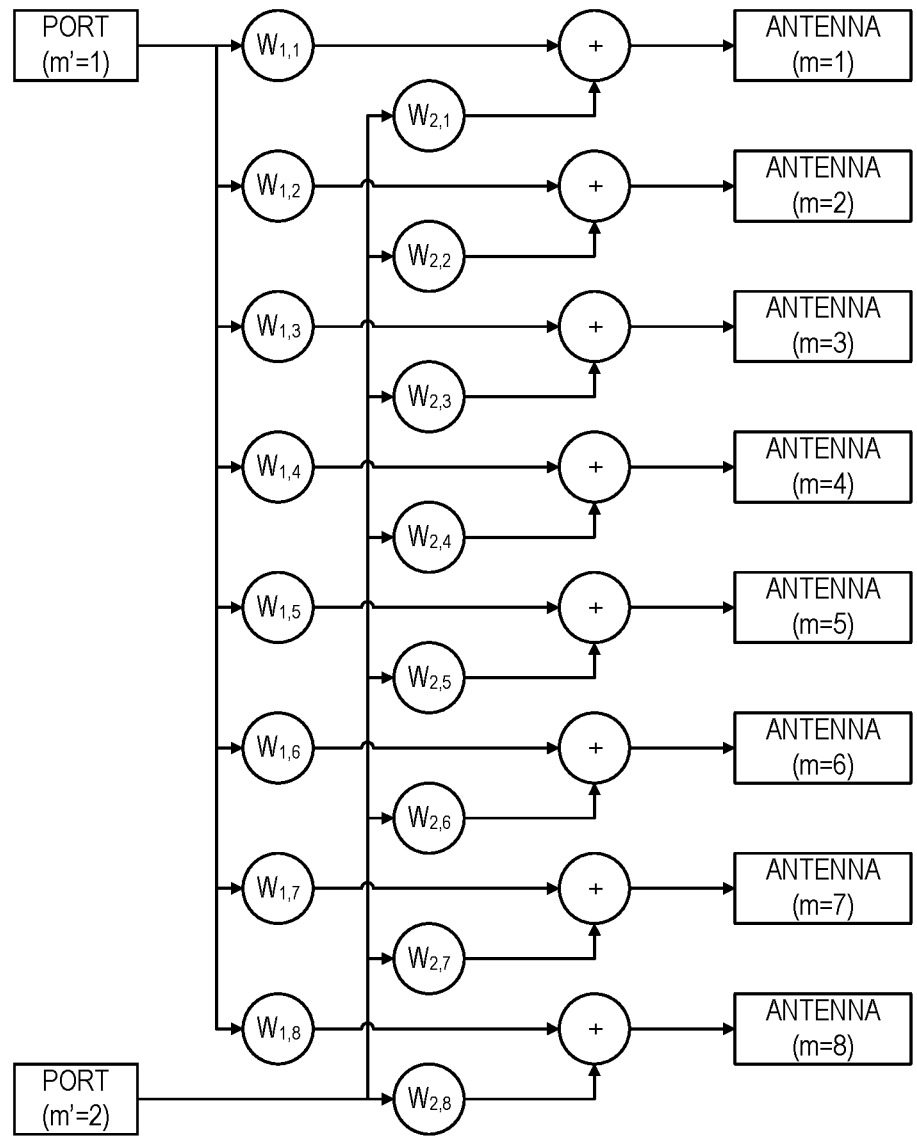
FIG. 2 is an illustration of port to antenna mapping (i.e., Active Antenna System (AAS) virtualization)
Figure 3:
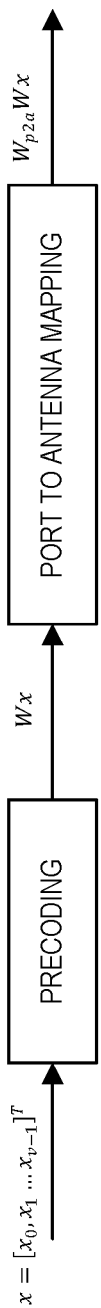
FIG. 3 illustrates a system model of downlink precoding in a virtualized AAS.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Before describing embodiments of the present disclosure, a discussion of some problems associated with a virtualized Active Antenna System (AAS) is beneficial. Full Dimension Multiple Input Multiple Output (FD-MIMO) is a feature in new and upcoming releases of Long Term Evolution (LTE) that is intended to bring about improved user data rates and system capacity that meet Fifth Generation (5G) standards. Channel State Information (CSI) feedback mechanisms introduced in LTE Release (Rel) 13 utilize non-precoded CSI Reference Signals (CSI-RSs). Precoding matrix codebooks are designed to support two-dimensional port layouts with up to 16 antenna ports. The non-precoded CSI-RSs are transmitted from each antenna and broadcast in the cell. LTE Rel-13 also introduced another CSI feedback type with terminal-specific, beamformed CSI-RS, in the same fashion as Physical Downlink Shared Channel (PDSCH). FD-MIMO utilizes builds on these existing CSI feedback mechanisms by using precoded, or beamformed, CSI-RS.

With respect to non-precoded CSI-RS, a two-dimensional Discrete Fourier Transform (DFT) codebook is proposed in International Publication No. WO 2014/198037 A1 to Cheng et al. and 3GPP Technical Specification (TS) 36.213 V14.2.0 ("CLASS A"). The precoding matrix W is further described as a two-stage precoding structure as follows:

$$W = W_1 W_2$$

where $W_1$ consists of a group of two-dimensional Grid-Of-Beams (GoBs) denoted by:

$$W_1 = \begin{bmatrix} X_h \otimes X_v & 0 \\ 0 & X_h \otimes X_v \end{bmatrix}$$

where $X_h(X_h \in B_h)$ and $X_v(X_v \in B_v)$ are a group of GoB vectors for the horizontal direction and the vertical direction, respectively; and $B_h$ and $B_v$ are over-sampled DFT matrices that serve as codebooks for the horizontal direction and the vertical direction, respectively. $W_2$ is used for beam selection within $W_1$ and co-phasing between two polarizations.

The codebooks $B_h$ and $B_v$ are defined according to the configurations of two-dimensional antenna ports by assuming that port to antenna element mapping is a one-to-one mapping. In other words, $W_{p2a}$ is an identity matrix. Thus, it is not optimized for virtualized AAS, in which antenna ports are virtualized from a set of antenna elements with a matrix $W_{p2a}$. The optimum codebook should be relevant to port to antenna mapping matrix.

For precoded CSI-RS ("CLASS B"), the codebook defined in 3GPP TS 36.213 V14.2.0 is based on the number of antenna ports and is irrelevant to port to antenna port mapping matrix $W_{p2a}$ as well. That is, a single codebook is applied to any kind of antenna port virtualization as long as the number of antenna ports are same. In fact, the optimum codebook for virtualized antenna ports should be relevant to the port to antenna mapping matrix $W_{p2a}$. For instance, if a two-dimensional DFT codebook is assumed to be optimum for a non-virtualized AAS (in this case, $W_{p2a}$ is identity matrix), it is no longer optimum for a virtualized AAS with a non-identity virtualization matrix.

Systems and methods are disclosed herein that relate to a codebook solution for a virtualized AAS. In general, a codebook for non-virtualized AAS, which is in the non-virtualized antenna domain, is transformed into another codebook that is in the virtualized antenna domain using a matrix that is relevant to the port to antenna mapping matrix $W_{p2a}$. In some embodiments, the new codebook is used by a wireless device to estimate a Precoding Matrix Indication (PMI) based on a downlink reference signal (e.g., precoded CSI-RS). In some other embodiments, the new codebook is used by a network node (e.g., an enhanced or evolved Node B (eNB) or a New Radio (NR) base station (gNB)) to estimate a PMI based on an uplink reference signal (e.g., Demodulation Reference Signal (DMRS) or Sounding Reference Signal (SRS)). The port to antenna mapping matrix $W_{p2a}$ can be either predefined, determined by the wireless device, e.g., using a downlink reference signal, or determined by the network node (e.g., baseband unit of an eNB or gNB or a Remote Radio Head (RRH)), e.g., using an uplink reference signal.

By using the transformed codebook, the codebook for the virtualized AAS is jointly optimized with the port to antenna mapping matrix $W_{p2a}$. The PMI can be estimated in the virtualized antenna domain (i.e., in the transformed antenna port space) with a reduced number of downlink reference signals (e.g., precoded CSI-RS) or a reduced dimension of uplink reference signals (e.g., SRS or DMRS).

Figure 4:
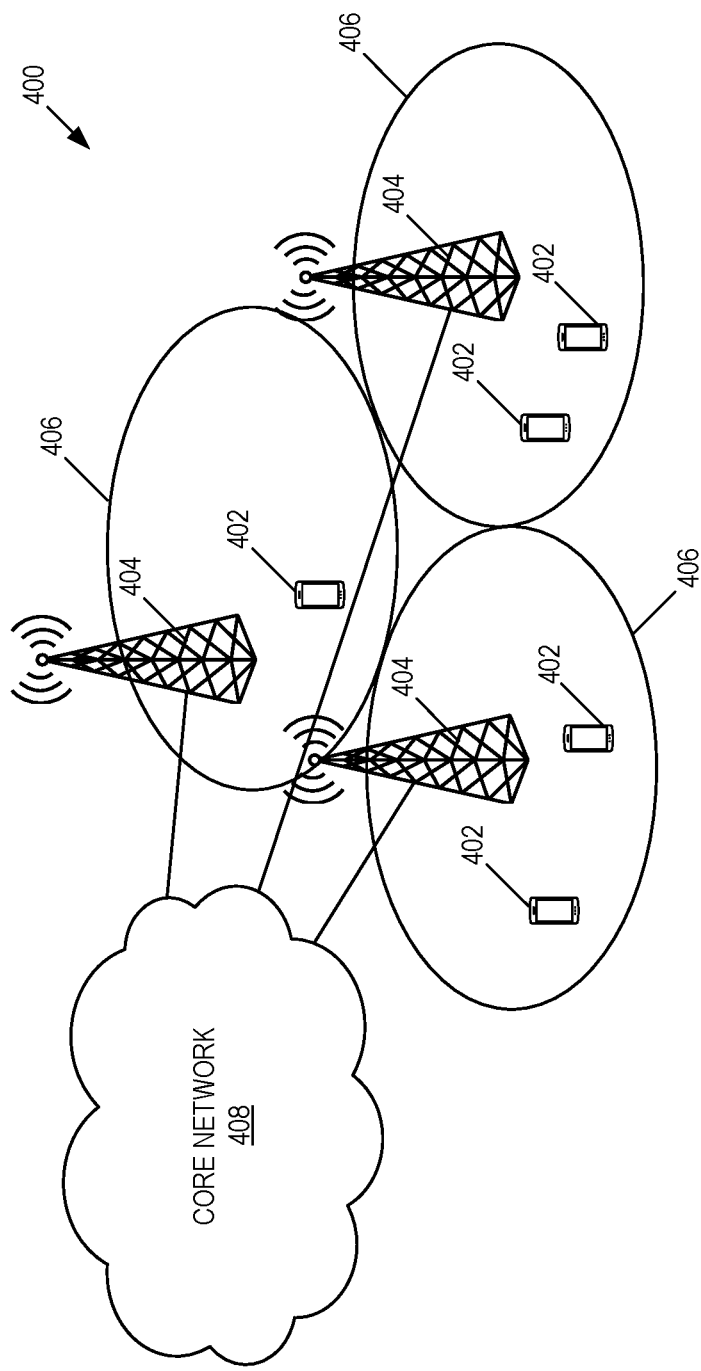
FIG. 4 illustrates one example of a wireless communication system in which embodiments of the present disclosure may be implemented.

In this regard, FIG. 4 illustrates one example of a wireless communication system 400 in which embodiments of the present disclosure may be implemented. As illustrated, the wireless communication system 400 provides wireless access to a number of wireless communication devices 402 (e.g., User Equipment devices (UEs)). The wireless communication system 400 includes a radio access network that includes a number of radio access nodes 404 (e.g., eNBs, gNBs, or RRHs) serving corresponding cells 406. The radio access nodes 404 are connected to a core network 408 that includes a number of core network nodes, as will be appreciated by one of ordinary skill in the art.

In some embodiments, the radio access nodes 404 include a virtualized AAS. Systems and methods are disclosed herein that related to determining a codebook that is in the virtualized antenna domain and using the determined codebook for PMI estimation.

Figure 5:
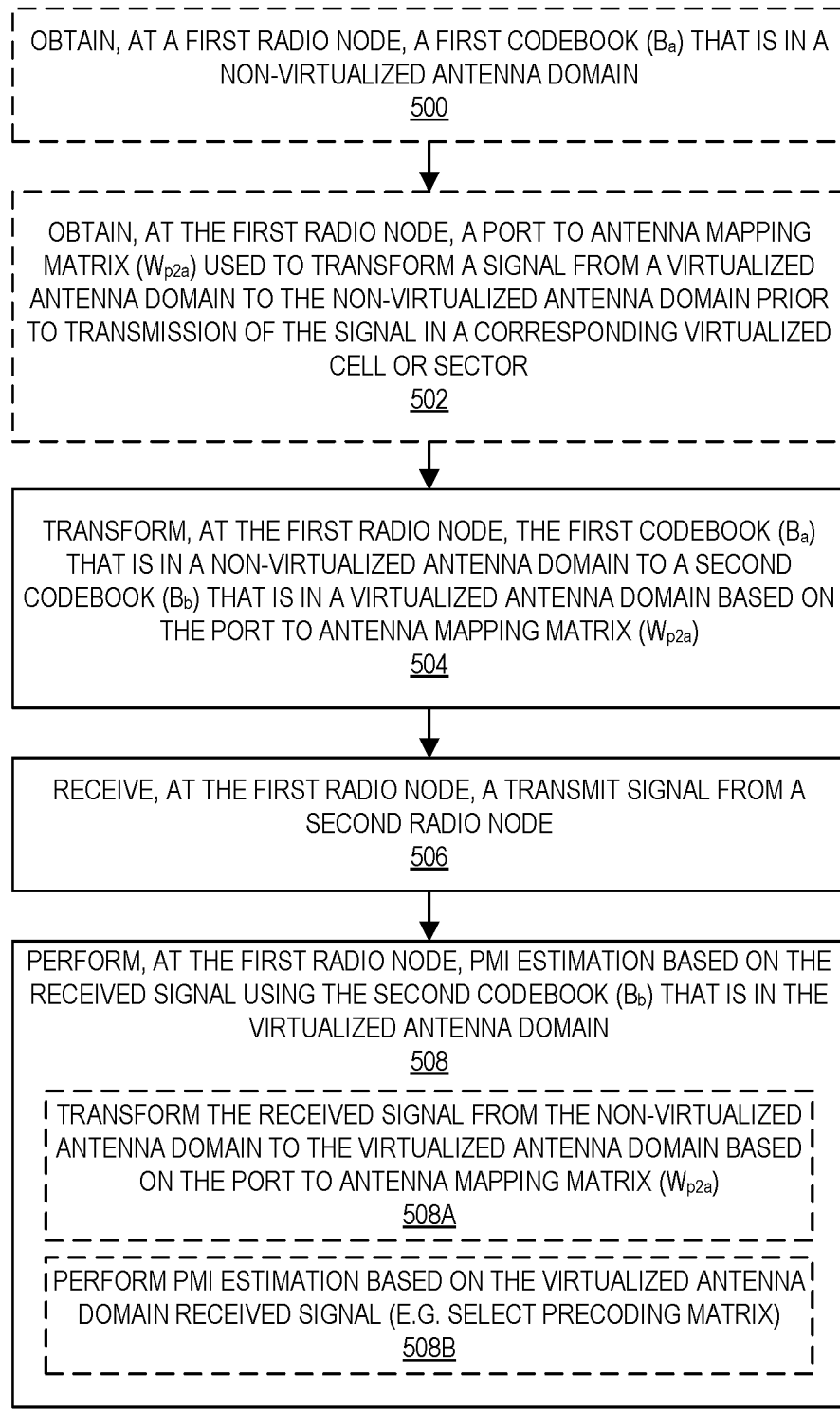
FIG. 5 is a flow chart that illustrates the operation of a first radio node in accordance with some embodiments of the present disclosure.

FIG. 5 is a flow chart that illustrates the operation of a first radio node in accordance with some embodiments of the present disclosure. Optional steps are represented by dashed lines. In some embodiments, the first radio node is a radio access node 404. In some other embodiments, the first radio node is a wireless device 402. As illustrated, the first radio node obtains a first codebook ($B_a$) that is in the non-virtualized antenna domain (step 500). More specifically, first, the codebooks $B_h$ and $B_v$ are designed in the non-virtualized antenna domain (i.e., for a non-virtualized AAS) for the horizontal direction and the vertical direction, respectively, and predefined for both the wireless device 402 and the radio access node 404 according to the dimensions of a two-dimensional antenna array. One example is a GoB codebook with over-sampled DFT matrix (WO 2014/198037 A1 and 3GPP TS 36.213 V14.2.0). Then, the combined two-dimensional GoB codebook for both the horizontal and vertical directions per polarization can be expressed by a Kronecker product of codebook in horizontal and vertical directions as follows:

$$B_a = B_h \otimes B_v.$$

The first codebook ($B_a$) can also be further extended to a three-dimensional GoB codebook for AAS with cross-polarization, expressed by $$B_a = B_p \otimes B_h \otimes B_v$$

where codebook $B_p$ is for co-phasing cross polarizations.

The first radio node also obtains a port to antenna mapping matrix $W_{p2a}$ (step 502). The port to antenna mapping matrix $W_{p2a}$ is a matrix utilized to transform a signal (e.g., a reference signal) from the non-virtualized antenna domain to the virtualized antenna domain prior to transmission in a corresponding virtualized cell or sector (i.e., a cell or sector for which a virtualized AAS is utilized to, e.g., transmit beamformed CSI-RS) within the wireless communication system 400. In some embodiments, the port to antenna mapping matrix $W_{p2a}$ is predefined for each virtualized sector or cell. In some other embodiments, the port to antenna mapping matrix $W_{p2a}$ is determined by the wireless device 402 using a set of precoded beam reference signals. For instance, a set of beam reference signals that are precoded by each column of a matrix $V(W_{p2a} \in V)$ are transmitted by the radio access node 404. The codebook V is known by the wireless device 402. The wireless device 402 uses the codebook V and the precoded beam reference signals to estimate $W_{p2a}$ and report an indication of the estimated $W_{p2a}$ (e.g., an index of the estimated $W_{p2a}$ within V) to the radio access node 404. Then, the radio access node 404 performs port to antenna mapping according to $W_{p2a}$. In some other embodiments, the port to antenna mapping matrix $W_{p2a}$ is estimated at the radio access node 404 (e.g., at a Baseband Unit (BBU) of an eNB or gNB or at a RRH) by, e.g., using uplink DMRS or SRS.

An optimum port to antenna mapping matrix $W_{p2a}$ would be a subset of an orthogonal base, e.g. conjugate of Eigen vectors of an estimated uplink channel matrix, by which the channel from a specific virtualized sector or cell can be represented by a linear combination of $W_{p2a}$ expressed by $$H_{UL} = W^*_{p2a} \beta$$

where ( )* denotes conjugate of a matrix and $\beta$ is a vector with dimensions of $N_b \times N_r$. Similarly, the downlink channel from a specific virtualized sector or cell can be represented by a linear combination of $W_{p2a}^H$ expressed by:

$$H_{DL} = \alpha W_{p2a}^H$$

where $\alpha$ is a vector with dimension of $N_r \times N_b$.

The first radio node transforms the first codebook $(B_a)$ that is in the non-virtualized antenna domain into a second codebook $(B_b)$ that is in the virtualized antenna domain based on the port to antenna mapping matrix $W_{p2a}$ (step 504).

In some embodiments, the second codebook $(B_b)$ is a function of the first codebook $(B_a)$ and the port to antenna mapping matrix $W_{p2a}$. More specifically, with a given optimum precoding matrix $w_a \in B_a$ for non-virtualized antenna elements and the port to antenna mapping matrix $W_{p2a}$, there exists a precoding matrix $w_b$ ($w_b \in B_b$) which allows $W_{p2a} w_b$ to be as close as possible to $w_a$, as expressed by:

$$w_b = \mathrm{argmin}_{w_b \in B_b} \|w_a - W_{p2a} w_b\|.$$

A resolution of $w_b$ would be $$w_b = (W_{p2a}^H W_{p2a})^{-1} W_{p2a}^H w_a$$

Thus, the codebook $B_a$ that is in the non-virtualized antenna domain is transformed to another codebook $B_b$ that is in the virtualized antenna domain with matrix $(W_{p2a}^H W_{p2a})^{-1} W_{p2a}^H$. Each column of $B_b$ is associated with corresponding column of codebook $B_a$, expressed by $$B_b = (W_{p2a}^H W_{p2a})^{-1} W_{p2a}^H B_a$$

In case each column of $W_{p2a}$ is orthogonal, that is $W_{p2a}^H W_{p2a} = I$, then $$B_b = W_{p2a}^H B_a$$

In case $W_{p2a}$ is an invertible matrix, then $$B_b = W_{p2a}^{-1} B_a$$

Any codebook restrictions can be applied to the transformed codebook $B_b$. For instance, if the codebook is restricted in $B_a$, the associated codebook in $B_b$ should be also restricted. Thus, for example, the first radio node may be a wireless device and the second radio node may be a network node, where the network node signals a codebook restriction to the wireless device for the codebook $B_a$ and the wireless device applies the codebook restriction to the codebook $B_b$ when performing PMI estimation. Additional rules of codebook restriction can be applied to $B_b$. The codebook in $B_b$ is restricted if the norm of $B_b$ is below a threshold.

The first radio node receives a signal transmitted from a second radio node (step 506). The first radio node then performs PMI estimation based on the received signal using the second codebook $(B_b)$ that is in the virtualized antenna domain (step 508).

More specifically, in some embodiments, the first radio node is the wireless device 402, the second radio node is the radio access node 404, and the signal received by the wireless device 402 from the radio access node 404 is a downlink reference signal (e.g., a precoded CSI-RS), where the radio access node 404 transmitted the reference signal using a virtualized AAS. The received signal can thus be modelled as:

$$y = H_{DL} W_{p2a} Wx + n,$$

where W is the precoding matrix utilized by the radio access node 404 for precoding in the virtualized antenna domain (i.e., in a logical antenna port or virtual beam space) with dimension of $N_b \times N_v$, where $N_v$ is the number of layers; $W_{p2a}$ is the $N_t \times N_b$ port to antenna mapping matrix used by the radio access node 404 to transform the precoded signal from the non-virtualized antenna domain to the virtualized antenna domain or, in other words, map the $N_b$ logical antenna ports or virtual beams to the $N_t$ antenna elements; $H_{DL}$ is the downlink channel matrix for an un-virtualized AAS with dimension of $N_r \times N_t$; and $N_r$ is the number of receiving antenna at the wireless device 402.

With a downlink reference signal for a virtualized AAS (e.g., precoded CSI-RS), the effective downlink channel $H_b$ observed by the wireless device 402 for logical antenna ports can expressed as:

$$H_b = H_{DL} W_{p2a}$$

where $H_{DL}$ is the downlink channel matrix that defines the downlink channel between the radio access node 404 and the wireless device 402. The optimum precoding matrix W is selected by the wireless device 402, and an indication (e.g., an index) of this precoding matrix W is reported to the radio access node 404. Any suitable scheme can be used by the wireless device 402 to select the optimum precoding matrix W. As one non-limiting example, the optimum precoding vectors can be estimated as expressed by:

$$w_b = \underset{w_b \in B_b}{\mathrm{argmax}}\, w_b^H R_b w_b$$

where $$R_b = E[H_b^H H_b].$$

In some other embodiments, the first radio node is the radio access node 404, the second radio node is the wireless device 402, and the signal received by the radio access node 404 from the wireless device 402 is an uplink reference signal (e.g., a DMRS or SRS). Here, the system is a Time Division Duplexing (TDD) system where channel reciprocity can be assumed. In this case, the effective downlink channel $H_b$ can be estimated by a linear transformation of the uplink reference signal with $W_{p2a}$ as described as follows:

$$H_b = H_{DL} W_{p2a} = H_{UL}^T W_{p2a} = (W_{p2a}^T H_{UL})^T$$

The equivalent is to transform the received uplink reference signal by a matrix $W_{p2a}^T$. Then, the optimum precoding vectors can be searched with transformed codebook and effective downlink channel $H_b$ for a virtualized AAS. In other words, the radio access node 404 first transforms the received reference signal based on the port to antenna mapping matrix $W_{p2a}$ (step 508A). Specifically, the radio access node 404 transforms the received signal by a matrix $W_{p2a}^T$, as described above. The radio access node 404 then performs PMI estimation based on the resulting virtualized domain received signal (step 508B).

Note that the transformed codebook ($B_b$) for the virtualized AAS is equivalent to the codebook defined for non-virtualized AAS in terms of beamformed power observed by the wireless device 402, if $W_{p2a}$ is optimized to satisfy $$H_{DL} = \alpha W_{p2a}^H \text{ and } W_{p2a}^H W_{p2a} = I$$

Then, $$H_b = H_{DL} W_{p2a} = \alpha W_{p2a}^H W_{p2a} = \alpha$$

Thus $$H_{DL} = H_b W_{p2a}^H$$

For $w_b$ searched with transformed codebook $B_b$ in the virtualized AAS, the corresponding precoding $w_a$ in the codebook $B_a$ for the un-virtualized AAS is also optimum, thanks to $$\max_{w_b \in B_b} w_b^H R_b w_b = \max_{w_a \in B_a} (W_{p2a}^H w_a)^H E[H_b^H H_b](W_{p2a}^H w_a)$$
$$= \max_{w_a \in B_a} w_a^H E[(H_b W_{p2a}^H)^H H_b W_{p2a}^H] w_a$$
$$= \max_{w_a \in B_a} w_a^H E[H_{DL}^H H_{DL}] w_a$$
$$= \max_{w_a \in B_a} w_a^H R_a w_a$$

In case $W_{p2a}$ is invertible, $w_a = W_{p2a} w_b$. The equivalence is still valid, since $$\max_{w_b \in B_b} w_b^H R_b w_b = \max_{w_b \in B_b} w_b^H E[(H_{DL} W_{p2a})^H (H_{DL} W_{p2a})] w_b$$
$$= \max_{w_b \in B_b} (W_{p2a} w_b)^H E[H_{DL}^H H_{DL}] W_{p2a} w_b$$
$$= \max_{w_a \in B_a} w_a^H R_a w_a$$

Figure 6A:
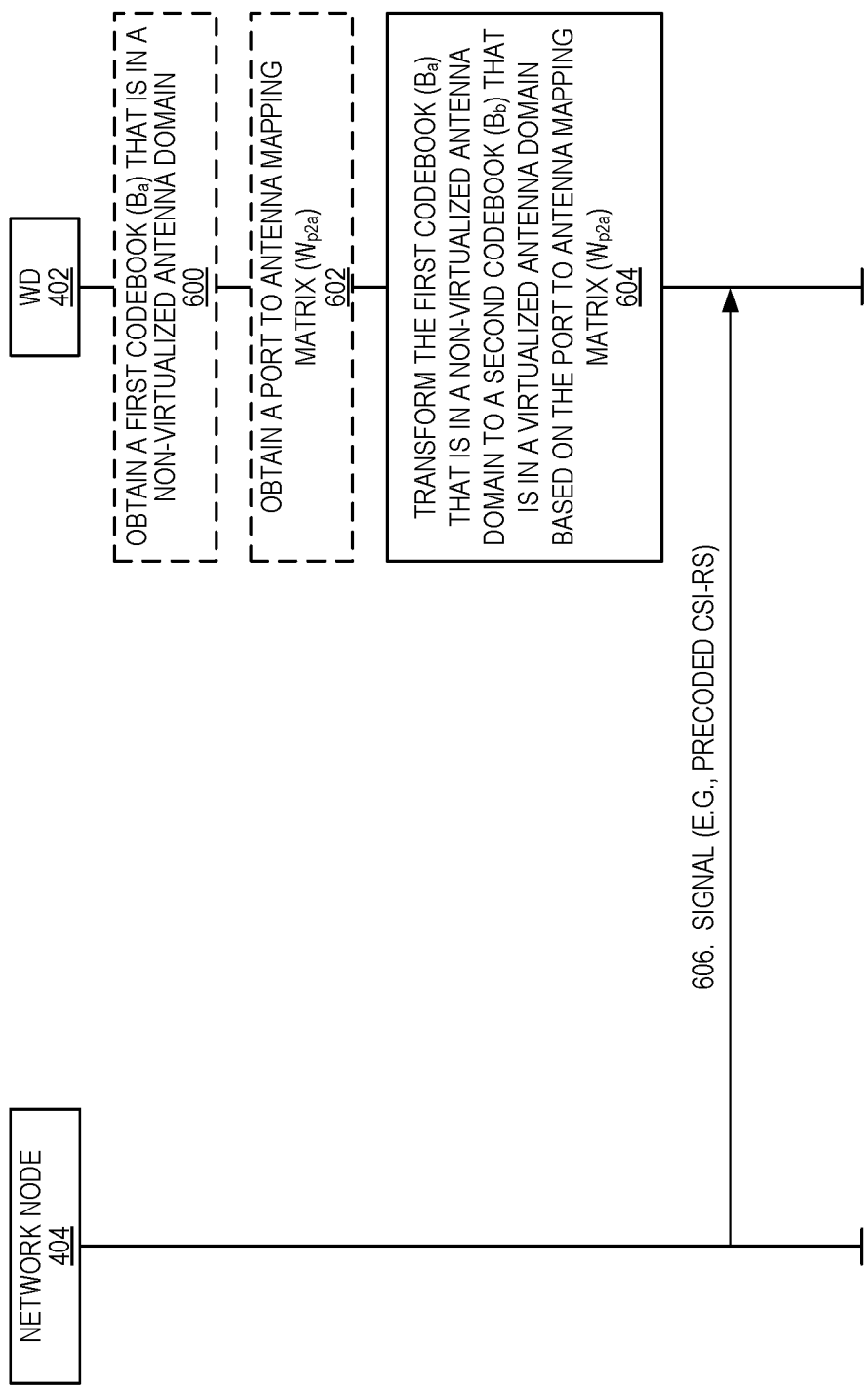
FIGS. 6A and 6B illustrate the operation of network node and a wireless device where the wireless device performs the process of FIG. 5 in accordance with some embodiments of the present disclosure.
Figure 6B:
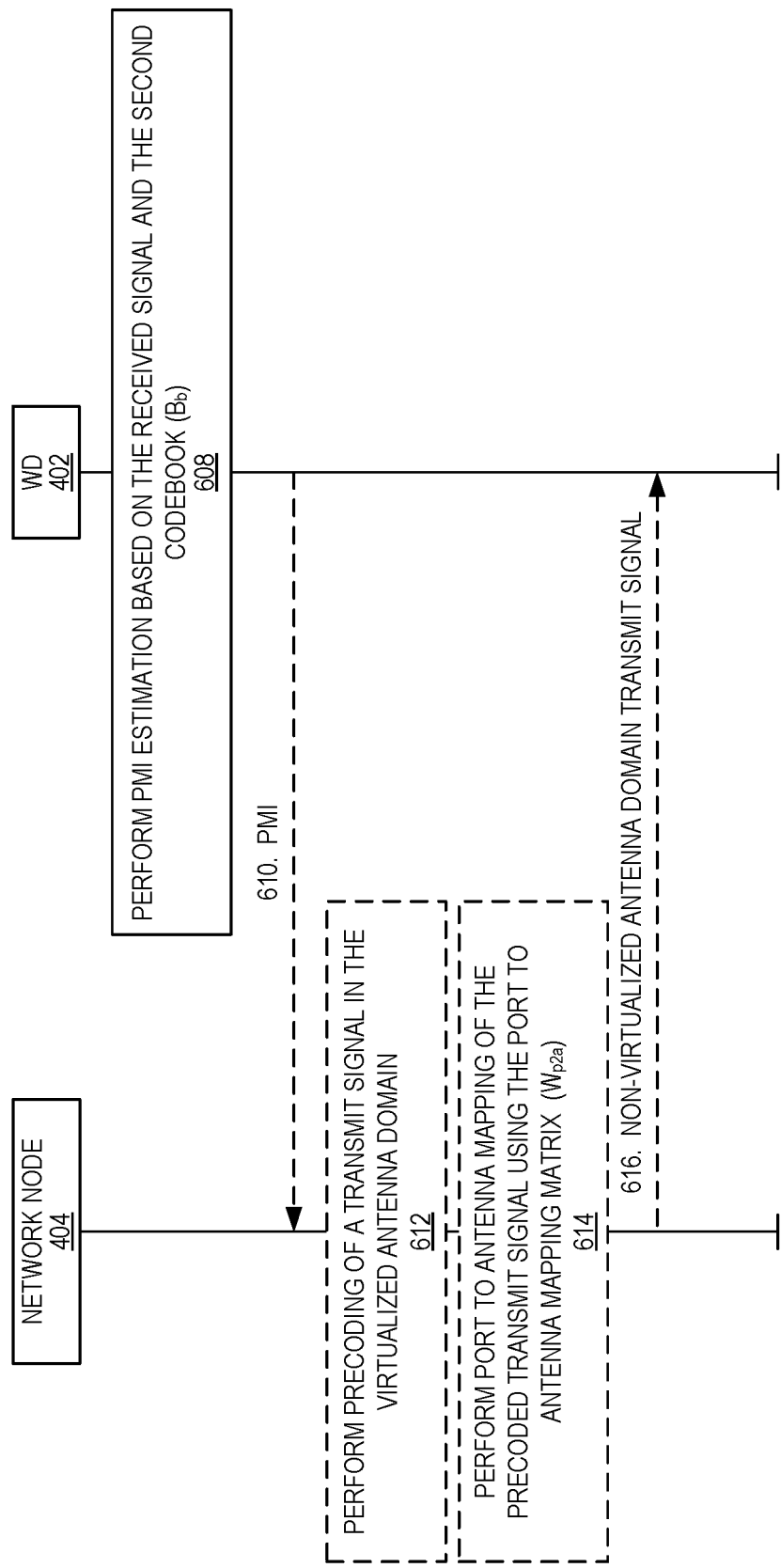

FIGS. 6A and 6B illustrate the operation of a radio access node 404 (also referred to herein more generally as a network node) and a wireless device 402, where the wireless device 402 performs the process of FIG. 5 in accordance with some embodiments of the present disclosure. Optional steps are represented by dashed lines. As illustrated, the wireless device 402 obtains the first codebook ($B_a$) that is in the non-virtualized antenna domain, as described above with respect to step 500 (step 600). The wireless device 402 also obtains the port to antenna mapping matrix $W_{p2a}$, as described above with respect to step 502 (step 602). The wireless device 402 transforms the first codebook ($B_a$) that is in the non-virtualized antenna domain into the second codebook ($B_b$) that is in the virtualized antenna domain based on the port to antenna mapping matrix $W_{p2a}$, as described above with respect to step 504 (step 604).

The wireless device 402 receives a downlink signal (e.g., a downlink reference signal such as, e.g., a precoded CSI-RS) transmitted from the radio access node 404 (step 606). The wireless device 402 then performs PMI estimation based on the received signal using the second codebook ($B_b$) that is in the virtualized antenna domain, as described above with respect to step 508 (step 608). The wireless device 402 sends an indication of the selected precoding matrix W to the radio access node 404 (step 610). This indication may be in the form of an index of the selected precoding matrix within the second codebook ($B_b$).

The radio access node 404 performs precoding of a transmit signal in the virtualized antenna domain using the selected precoding matrix W (step 612) and performs port to antenna mapping on the precoded transmit signal using the port to antenna mapping matrix $W_{p2a}$ (step 614). The radio access node 404 then transmits the resulting non-virtualized antenna domain transmit signal (step 616).

Figure 7A:
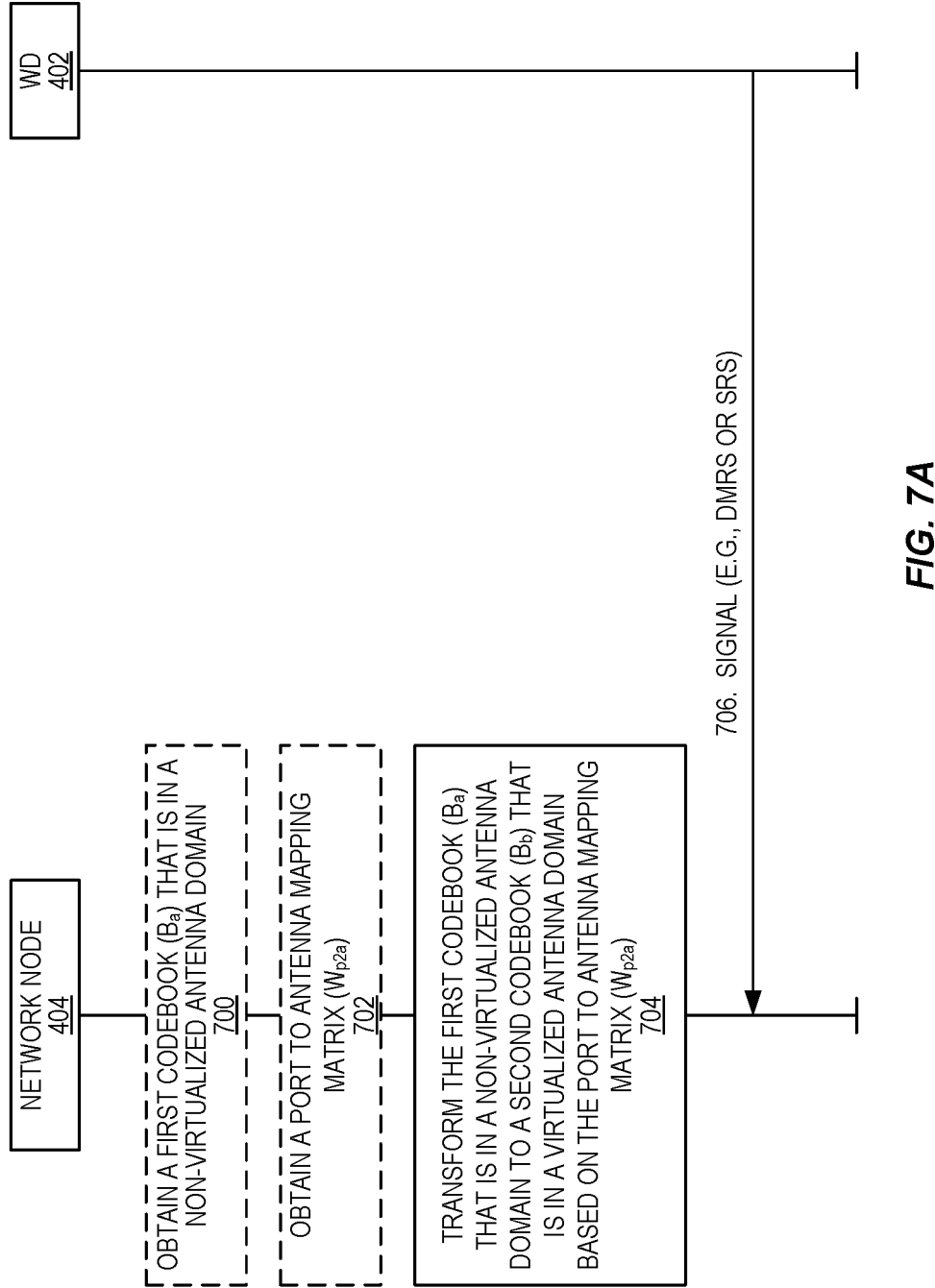
FIGS. 7A and 7B illustrate the operation of a network node and a wireless device where the network node performs the process of FIG. 5 in accordance with some embodiments of the present disclosure.
Figure 7B:
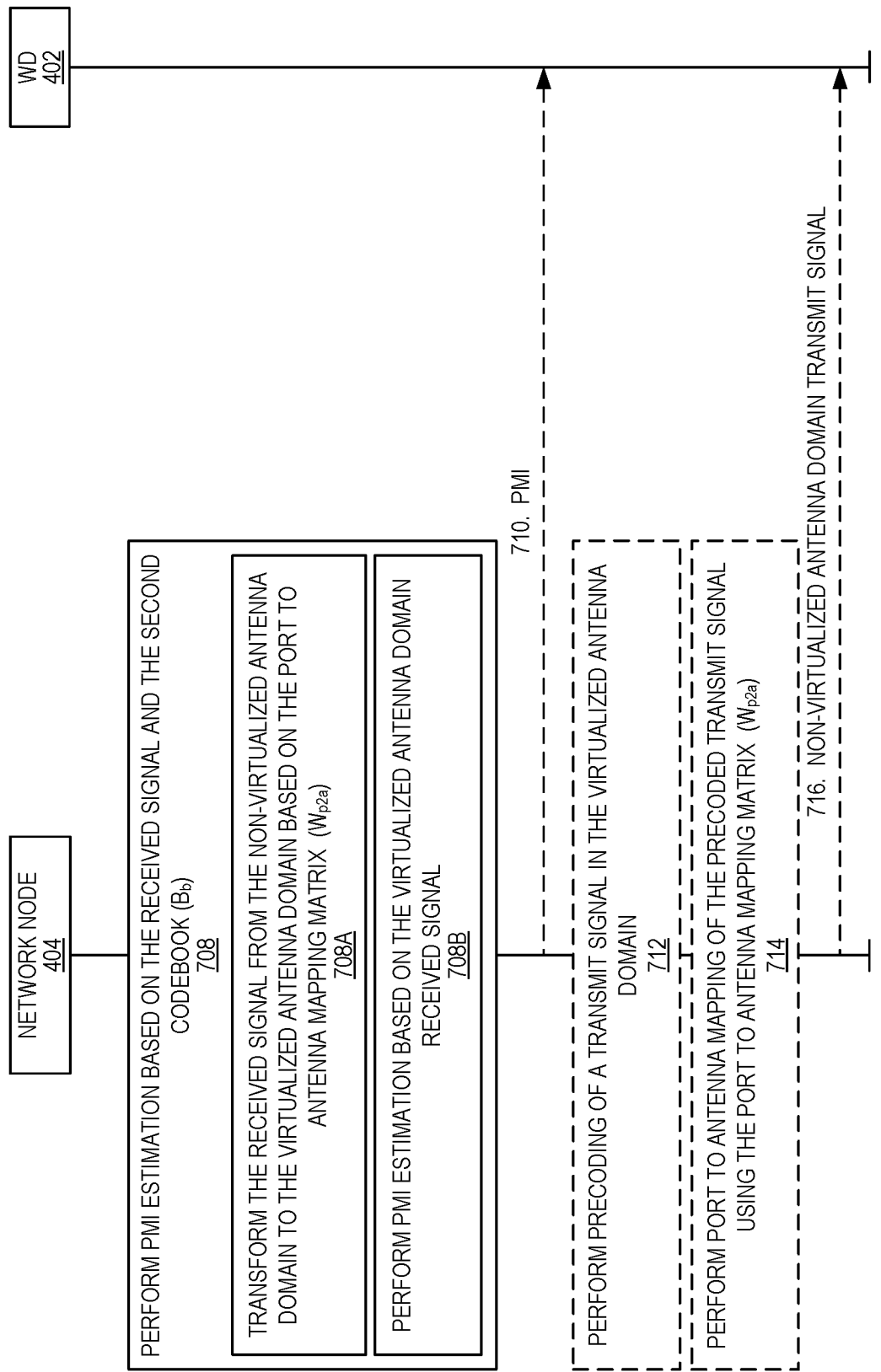

FIGS. 7A and 7B illustrate the operation of a radio access node 404 (also referred to herein more generally as a network node) and a wireless device 402, where the radio access node 404 performs the process of FIG. 5 in accordance with some embodiments of the present disclosure. Optional steps are represented by dashed lines. As illustrated, the radio access node 404 obtains the first codebook ($B_a$) that is in the non-virtualized antenna domain, as described above with respect to step 500 (step 700). The radio access node 404 also obtains the port to antenna mapping matrix $W_{p2a}$, as described above with respect to step 502 (step 702). The radio access node 404 transforms the first codebook ($B_a$) that is in the non-virtualized antenna domain into the second codebook ($B_b$) that is in the virtualized antenna domain based on the port to antenna mapping matrix $W_{p2a}$, as described above with respect to step 504 (step 704).

The radio access node 404 receives an uplink signal (e.g., an uplink reference signal such as, e.g., SRS or DMRS) transmitted from the wireless device 402 (step 706). The radio access node 404 then performs PMI estimation based on the received signal using the second codebook ($B_b$) that is in the virtualized antenna domain, as described above with respect to step 508 (step 708). In some embodiments, the radio access node 404 transforms the received uplink reference signal based on the port to antenna mapping matrix $W_{p2a}$ (e.g., using $W_{p2a}^T$) and performs PMI estimation using the transformed uplink reference signal, as described above with respect to steps 508A and 508B (step 708A and 708B). The radio access node 404 sends an indication of the selected precoding matrix W to the wireless device 402 (step 710). This indication may be in the form of an index of the selected precoding matrix within the second codebook ($B_b$). In some embodiments, the radio access node 404 may indicate the selected precoding matrix W using a downlink modulation signal as currently defined in Third Generation Partnership Project (3GPP) standards.

The radio access node 404 performs precoding of a transmit signal in the virtualized antenna domain using the selected precoding matrix W (step 712) and performs port to antenna mapping on the precoded transmit signal using the port to antenna mapping matrix $W_{p2a}$ (step 714). The radio access node 404 then transmits the resulting non-virtualized antenna domain transmit signal (step 716).

Figure 8:
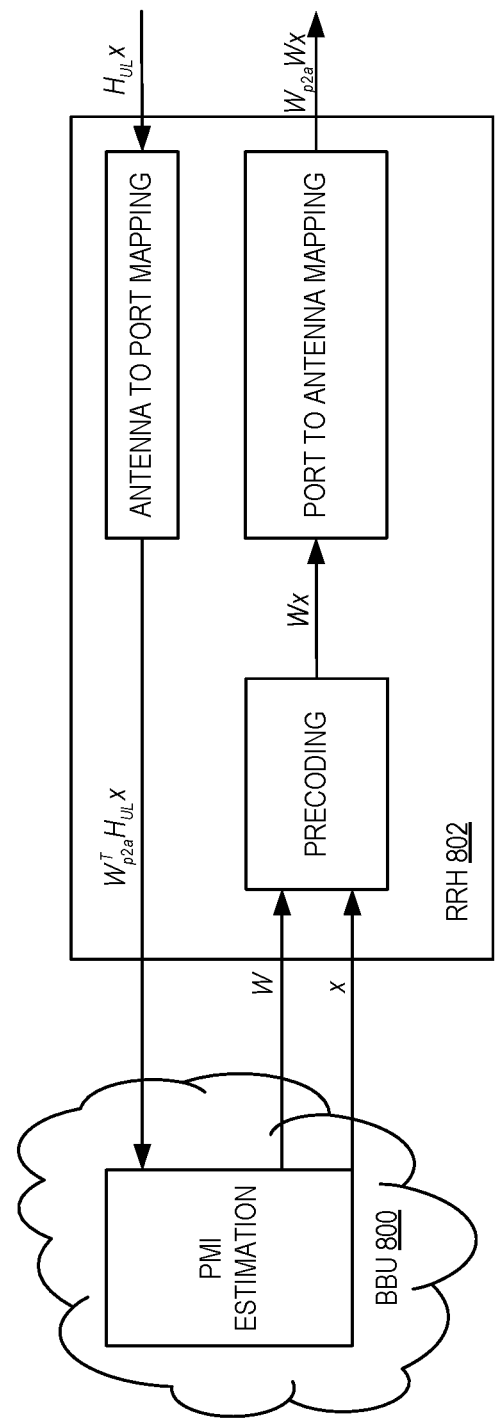
FIG. 8 illustrates one example of a cloud implementation of an example embodiment of the present disclosure.

FIG. 8 illustrates one example of a cloud implementation of an example embodiment of the present disclosure. In this example, the radio access node 404 includes a BBU 800 that is implemented "in the cloud" via, e.g., a centralized pool of BBUs. The radio access node 404 also includes a RRH 802. PMI estimation is performed by the BBU 800. Precoding and port to antenna mapping of downlink transmit signals is performed by the RRH 802. Antenna or port mapping of a received uplink reference signal is also performed by the RRH 802.

In this example, if the precoding matrix is estimated by the radio access node 402 based on an uplink reference signal, the uplink reference signal is first transformed with $W_{p2a}^T$. Then, the PMI is estimated in the BBU 800 with the transformed codebook and transformed reference signal. Alternatively, the radio access node 404 receives the estimated PMI from the wireless device 402, e.g., in a CSI report. The estimated or received precoding matrix or PMI are informed to the RRH 802 for precoding. The precoding is done in the RRH 802 according the PMI in the transformed codebook. The precoded signals are mapped to physical antenna elements with port to antenna mapping matrix.

Figure 9:
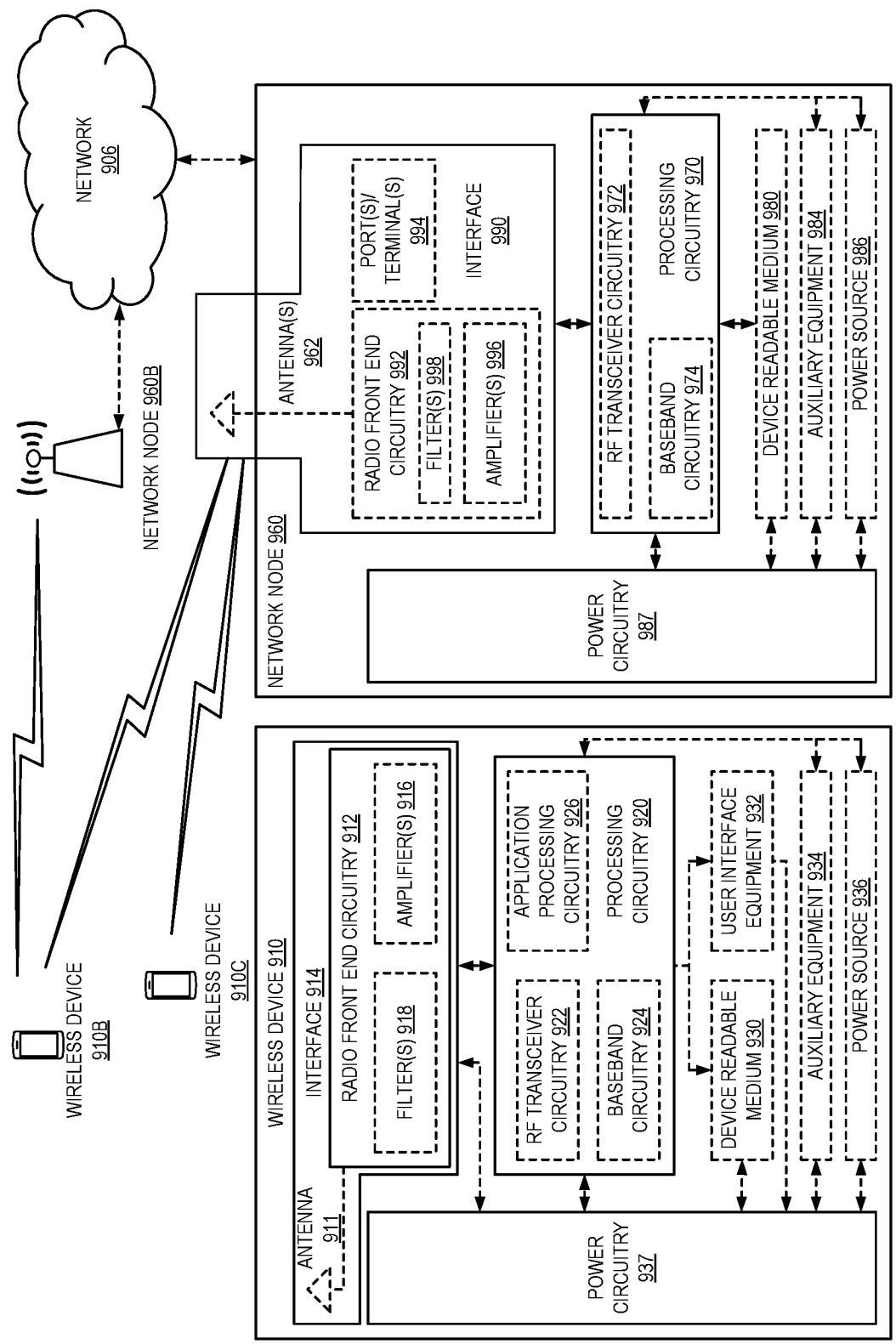
FIG. 9 illustrates an example of a wireless network.

Although the subject matter described herein may be implemented in any appropriate type of system using any suitable components, the embodiments disclosed herein are described in relation to a wireless network, such as the example wireless network illustrated in FIG. 9. Note that the wireless network of FIG. 9 is another example illustration of the wireless network of FIG. 4. For simplicity, the wireless network of FIG. 9 only depicts a network 906, network nodes 960 and 960B, and Wireless Devices (WDs) 910, 910B, and 910C. In practice, a wireless network may further include any additional elements suitable to support communication between wireless devices or between a wireless device and another communication device, such as a landline telephone, a service provider, or any other network node or end device. The network nodes 960 and 960B correspond to the network nodes 404 of FIG. 4. As such, the details provided herein regarding network nodes 960 and 960B are equally applicable to the network nodes 404, and vice versa. Likewise, the wireless devices 910, 910B, and 910C correspond to the wireless devices 402 of FIG. 4. As such, the details provided herein regarding the WDs 910, 910B, and 910C are equally applicable to the wireless device 402, and vice versa. Of the illustrated components, the network node 960 and the WD 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

network 906 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 960 and the WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs) and Base Stations (BSs) (e.g., radio base stations, Node Bs, eNBs, and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as RRHs. Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, the network node 960 includes processing circuitry 970, a device readable medium 980, an interface 990, auxiliary equipment 984, a power source 986, power circuitry 987, and an antenna 962. Although the network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 960 are depicted as single boxes located within a larger box, or nested within multiple boxes, in practice, a network node may comprise multiple different physical components that make up a single illustrated component (e.g., the device readable medium 980 may comprise multiple separate hard drives as well as multiple Random Access Memory (RAM) modules).

Similarly, the network node 960 may be composed of multiple physically separate components (e.g., a Node B component and a RNC component, or a BTS component and a BSC component, etc.), which may each have their own respective components. In certain scenarios in which the network node 960 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 960 may be configured to support multiple Radio Access Technologies (RATs). In such embodiments, some components may be duplicated (e.g., a separate device readable medium 980 for the different RATs) and some components may be reused (e.g., the same antenna 962 may be shared by the RATs). The network node 960 may also include multiple sets of the various illustrated components for different wireless technologies integrated into the network node 960, such as, for example, GSM, Wideband Code Division Multiple Access (WCDMA), LTE, NR, WiFi, or Bluetooth wireless technologies. These wireless technologies may be integrated into the same or a different chip or set of chips and other components within the network node 960.

The processing circuitry 970 is configured to perform any determining, calculating, or similar operations (e.g., certain obtaining operations) described herein as being provided by a network node. These operations performed by the processing circuitry 970 may include processing information obtained by the processing circuitry 970 by, for example, converting the obtained information into other information, comparing the obtained information or converted information to information stored in the network node, and/or performing one or more operations based on the obtained information or converted information, and as a result of said processing making a determination.

The processing circuitry 970 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 960 components, such as the device readable medium 980, network node 960 functionality. For example, the processing circuitry 970 may execute instructions stored in the device readable medium 980 or in memory within the processing circuitry 970. Such functionality may include providing any of the various wireless features, functions, or benefits discussed herein. In some embodiments, the processing circuitry 970 may include a System on a Chip (SOC).

In some embodiments, the processing circuitry 970 may include one or more of Radio Frequency (RF) transceiver circuitry 972 and baseband processing circuitry 974. In some embodiments, the RF transceiver circuitry 972 and the baseband processing circuitry 974 may be on separate chips (or sets of chips), boards, or units, such as radio units and digital units. In alternative embodiments, part or all of the RF transceiver circuitry 972 and the baseband processing circuitry 974 may be on the same chip or set of chips, boards, or units.

In certain embodiments, some or all of the functionality described herein as being provided by a network node, base station, eNB, or other such network device may be performed by the processing circuitry 970 executing instructions stored on the device readable medium 980 or memory within the processing circuitry 970. In alternative embodiments, some or all of the functionality may be provided by the processing circuitry 970 without executing instructions stored on a separate or discrete device readable medium, such as in a hard-wired manner. In any of those embodiments, whether executing instructions stored on a device readable storage medium or not, the processing circuitry 970 can be configured to perform the described functionality. The benefits provided by such functionality are not limited to the processing circuitry 970 alone or to other components of the network node 960, but are enjoyed by the network node 960 as a whole, and/or by end users and the wireless network generally.

The device readable medium 980 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 970. The device readable medium 980 may store any suitable instructions; data or information, including a computer program; software; an application including one or more of logic, rules, code, tables, etc.; and/or other instructions capable of being executed by the processing circuitry 970 and utilized by the network node 960. The device readable medium 980 may be used to store any calculations made by the processing circuitry 970 and/or any data received via the interface 990. In some embodiments, the processing circuitry 970 and the device readable medium 980 may be considered to be integrated.

The interface 990 is used in the wired or wireless communication of signaling and/or data between the network node 960, a network 906, and/or WDs 910. As illustrated, the interface 990 comprises port(s)/terminal(s) 994 to send and receive data, for example to and from the network 906 over a wired connection. The interface 990 also includes radio front end circuitry 992 that may be coupled to, or in certain embodiments a part of, the antenna 962. The radio front end circuitry 992 comprises filters 998 and amplifiers 996. The radio front end circuitry 992 may be connected to the antenna 962 and the processing circuitry 970. The radio front end circuitry 992 may be configured to condition signals communicated between the antenna 962 and the processing circuitry 970. The radio front end circuitry 992 may receive digital data that is to be sent out to other network nodes or WDs via a wireless connection. The radio front end circuitry 992 may convert the digital data into a radio signal having the appropriate channel and bandwidth parameters using a combination of the filters 998 and/or the amplifiers 996. The radio signal may then be transmitted via the antenna 962. Similarly, when receiving data, the antenna 962 may collect radio signals which are then converted into digital data by the radio front end circuitry 992. The digital data may be passed to the processing circuitry 970. In other embodiments, the interface 990 may comprise different components and/or different combinations of components.

In certain alternative embodiments, the network node 960 may not include separate radio front end circuitry 992; instead, the processing circuitry 970 may comprise radio front end circuitry and may be connected to the antenna 962 without separate radio front end circuitry 992. Similarly, in some embodiments, all or some of the RF transceiver circuitry 972 may be considered a part of the interface 990. In still other embodiments, the interface 990 may include the one or more ports or terminals 994, the radio front end circuitry 992, and the RF transceiver circuitry 972 as part of a radio unit (not shown), and the interface 990 may communicate with the baseband processing circuitry 974, which is part of a digital unit (not shown).

The antenna 962 may include one or more antennas, or antenna arrays, configured to send and/or receive wireless signals. The antenna 962 may be coupled to the radio front end circuitry 992 and may be any type of antenna capable of transmitting and receiving data and/or signals wirelessly. In some embodiments, the antenna 962 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 962 may be separate from the network node 960 and may be connectable to the network node 960 through an interface or port.

The antenna 962, the interface 990, and/or the processing circuitry 970 may be configured to perform any receiving operations and/or certain obtaining operations described herein as being performed by a network node. Any information, data, and/or signals may be received from a WD, another network node, and/or any other network equipment. Similarly, the antenna 962, the interface 990, and/or the processing circuitry 970 may be configured to perform any transmitting operations described herein as being performed by a network node. Any information, data, and/or signals may be transmitted to a WD, another network node, and/or any other network equipment.

The power circuitry 987 may comprise, or be coupled to, power management circuitry and is configured to supply the components of the network node 960 with power for performing the functionality described herein. The power circuitry 987 may receive power from the power source 986. The power source 986 and/or the power circuitry 987 may be configured to provide power to the various components of the network node 960 in a form suitable for the respective components (e.g., at a voltage and current level needed for each respective component). The power source 986 may either be included in, or be external to, the power circuitry 987 and/or the network node 960. For example, the network node 960 may be connectable to an external power source (e.g., an electricity outlet) via an input circuitry or interface such as an electrical cable, whereby the external power source supplies power to the power circuitry 987. As a further example, the power source 986 may comprise a source of power in the form of a battery or battery pack which is connected to, or integrated in, the power circuitry 987. The battery may provide backup power should the external power source fail. Other types of power sources, such as photovoltaic devices, may also be used.

Alternative embodiments of the network node 960 may include additional components beyond those shown in FIG. 9 that may be responsible for providing certain aspects of the network node's functionality, including any of the functionality described herein and/or any functionality necessary to support the subject matter described herein. For example, the network node 960 may include user interface equipment to allow input of information into the network node 960 and to allow output of information from the network node 960. This may allow a user to perform diagnostic, maintenance, repair, and other administrative functions for the network node 960.

As used herein, WD refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A WD may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 9, a WD 910 includes an antenna 911, an interface 914, processing circuitry 920, a device readable medium 930, user interface equipment 932, auxiliary equipment 934, a power source 936, and power circuitry 937. The WD 910 may include multiple sets of one or more of the illustrated components for different wireless technologies supported by the WD 910, such as, for example, GSM, WCDMA, LTE, NR, WiFi, WiMAX, or Bluetooth wireless technologies, just to mention a few. These wireless technologies may be integrated into the same or different chips or set of chips as other components within the WD 910.

The antenna 911 may include one or more antennas or antenna arrays configured to send and/or receive wireless signals and is connected to the interface 914. In certain alternative embodiments, the antenna 911 may be separate from the WD 910 and be connectable to the WD 910 through an interface or port. The antenna 911, the interface 914, and/or the processing circuitry 920 may be configured to perform any receiving or transmitting operations described herein as being performed by a WD. Any information, data, and/or signals may be received from a network node and/or another WD. In some embodiments, radio front end circuitry and/or the antenna 911 may be considered an interface.

As illustrated, the interface 914 comprises radio front end circuitry 912 and the antenna 911. The radio front end circuitry 912 comprises one or more filters 918 and amplifiers 916. The radio front end circuitry 912 is connected to the antenna 911 and the processing circuitry 920 and is configured to condition signals communicated between the antenna 911 and the processing circuitry 920. The radio front end circuitry 912 may be coupled to or be a part of the antenna 911. In some embodiments, the WD 910 may not include separate radio front end circuitry 912; rather, the processing circuitry 920 may comprise radio front end circuitry and may be connected to the antenna 911. Similarly, in some embodiments, some or all of RF transceiver circuitry 922 may be considered a part of the interface 914. The radio front end circuitry 912 may receive digital data that is to be sent out to other network nodes or WDs via a wireless connection. The radio front end circuitry 912 may convert the digital data into a radio signal having the appropriate channel and bandwidth parameters using a combination of the filters 918 and/or the amplifiers 916. The radio signal may then be transmitted via the antenna 911. Similarly, when receiving data, the antenna 911 may collect radio signals which are then converted into digital data by the radio front end circuitry 912. The digital data may be passed to the processing circuitry 920. In other embodiments, the interface 914 may comprise different components and/or different combinations of components.

The processing circuitry 920 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 910 components, such as the device readable medium 930, WD 910 functionality. Such functionality may include providing any of the various wireless features or benefits discussed herein. For example, the processing circuitry 920 may execute instructions stored in the device readable medium 930 or in memory within the processing circuitry 920 to provide the functionality disclosed herein.

As illustrated, the processing circuitry 920 includes one or more of the RF transceiver circuitry 922, baseband processing circuitry 924, and application processing circuitry 926. In other embodiments, the processing circuitry 920 may comprise different components and/or different combinations of components. In certain embodiments, the processing circuitry 920 of the WD 910 may comprise a SOC. In some embodiments, the RF transceiver circuitry 922, the baseband processing circuitry 924, and the application processing circuitry 926 may be on separate chips or sets of chips. In alternative embodiments, part or all of the baseband processing circuitry 924 and the application processing circuitry 926 may be combined into one chip or set of chips, and the RF transceiver circuitry 922 may be on a separate chip or set of chips. In still alternative embodiments, part or all of the RF transceiver circuitry 922 and the baseband processing circuitry 924 may be on the same chip or set of chips, and the application processing circuitry 926 may be on a separate chip or set of chips. In yet other alternative embodiments, part or all of the RF transceiver circuitry 922, the baseband processing circuitry 924, and the application processing circuitry 926 may be combined in the same chip or set of chips. In some embodiments, the RF transceiver circuitry 922 may be a part of the interface 914. The RF transceiver circuitry 922 may condition RF signals for the processing circuitry 920.

In certain embodiments, some or all of the functionality described herein as being performed by a WD may be provided by the processing circuitry 920 executing instructions stored on the device readable medium 930, which in certain embodiments may be a computer-readable storage medium. In alternative embodiments, some or all of the functionality may be provided by the processing circuitry 920 without executing instructions stored on a separate or discrete device readable storage medium, such as in a hard-wired manner. In any of those particular embodiments, whether executing instructions stored on a device readable storage medium or not, the processing circuitry 920 can be configured to perform the described functionality. The benefits provided by such functionality are not limited to the processing circuitry 920 alone or to other components of the WD 910, but are enjoyed by the WD 910 as a whole, and/or by end users and the wireless network generally.

The processing circuitry 920 may be configured to perform any determining, calculating, or similar operations (e.g., certain obtaining operations) described herein as being performed by a WD. These operations, as performed by the processing circuitry 920, may include processing information obtained by the processing circuitry 920 by, for example, converting the obtained information into other information, comparing the obtained information or converted information to information stored by the WD 910, and/or performing one or more operations based on the obtained information or converted information, and as a result of said processing making a determination.

The device readable medium 930 may be operable to store a computer program; software; an application including one or more of logic, rules, code, tables, etc.; and/or other instructions capable of being executed by the processing circuitry 920. The device readable medium 930 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 920. In some embodiments, the processing circuitry 920 and the device readable medium 930 may be considered to be integrated.

The user interface equipment 932 may provide components that allow for a human user to interact with the WD 910. Such interaction may be of many forms, such as visual, audial, tactile, etc. The user interface equipment 932 may be operable to produce output to the user and to allow the user to provide input to the WD 910. The type of interaction may vary depending on the type of user interface equipment 932 installed in the WD 910. For example, if the WD 910 is a smart phone, the interaction may be via a touch screen; if the WD 910 is a smart meter, the interaction may be through a screen that provides usage (e.g., the number of gallons used) or a speaker that provides an audible alert (e.g., if smoke is detected). The user interface equipment 932 may include input interfaces, devices and circuits, and output interfaces, devices and circuits. The user interface equipment 932 is configured to allow input of information into the WD 910, and is connected to the processing circuitry 920 to allow the processing circuitry 920 to process the input information. The user interface equipment 932 may include, for example, a microphone, a proximity or other sensor, keys/buttons, a touch display, one or more cameras, a Universal Serial Bus (USB) port, or other input circuitry. The user interface equipment 932 is also configured to allow output of information from the WD 910 and to allow the processing circuitry 920 to output information from the WD 910. The user interface equipment 932 may include, for example, a speaker, a display, vibrating circuitry, a USB port, a headphone interface, or other output circuitry. Using one or more input and output interfaces, devices, and circuits of the user interface equipment 932, the WD 910 may communicate with end users and/or the wireless network, and allow them to benefit from the functionality described herein.

The auxiliary equipment 934 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 934 may vary depending on the embodiment and/or scenario.

The power source 936 may, in some embodiments, be in the form of a battery or battery pack. Other types of power sources, such as an external power source (e.g., an electricity outlet), photovoltaic devices, or power cells may also be used. The WD 910 may further comprise the power circuitry 937 for delivering power from the power source 936 to the various parts of the WD 910 which need power from the power source 936 to carry out any functionality described or indicated herein. The power circuitry 937 may in certain embodiments comprise power management circuitry. The power circuitry 937 may additionally or alternatively be operable to receive power from an external power source, in which case the WD 910 may be connectable to the external power source (such as an electricity outlet) via input circuitry or an interface such as an electrical power cable. The power circuitry 937 may also in certain embodiments be operable to deliver power from an external power source to the power source 936. This may be, for example, for the charging of the power source 936. The power circuitry 937 may perform any formatting, converting, or other modification to the power from the power source 936 to make the power suitable for the respective components of the WD 910 to which power is supplied.

Figure 10:
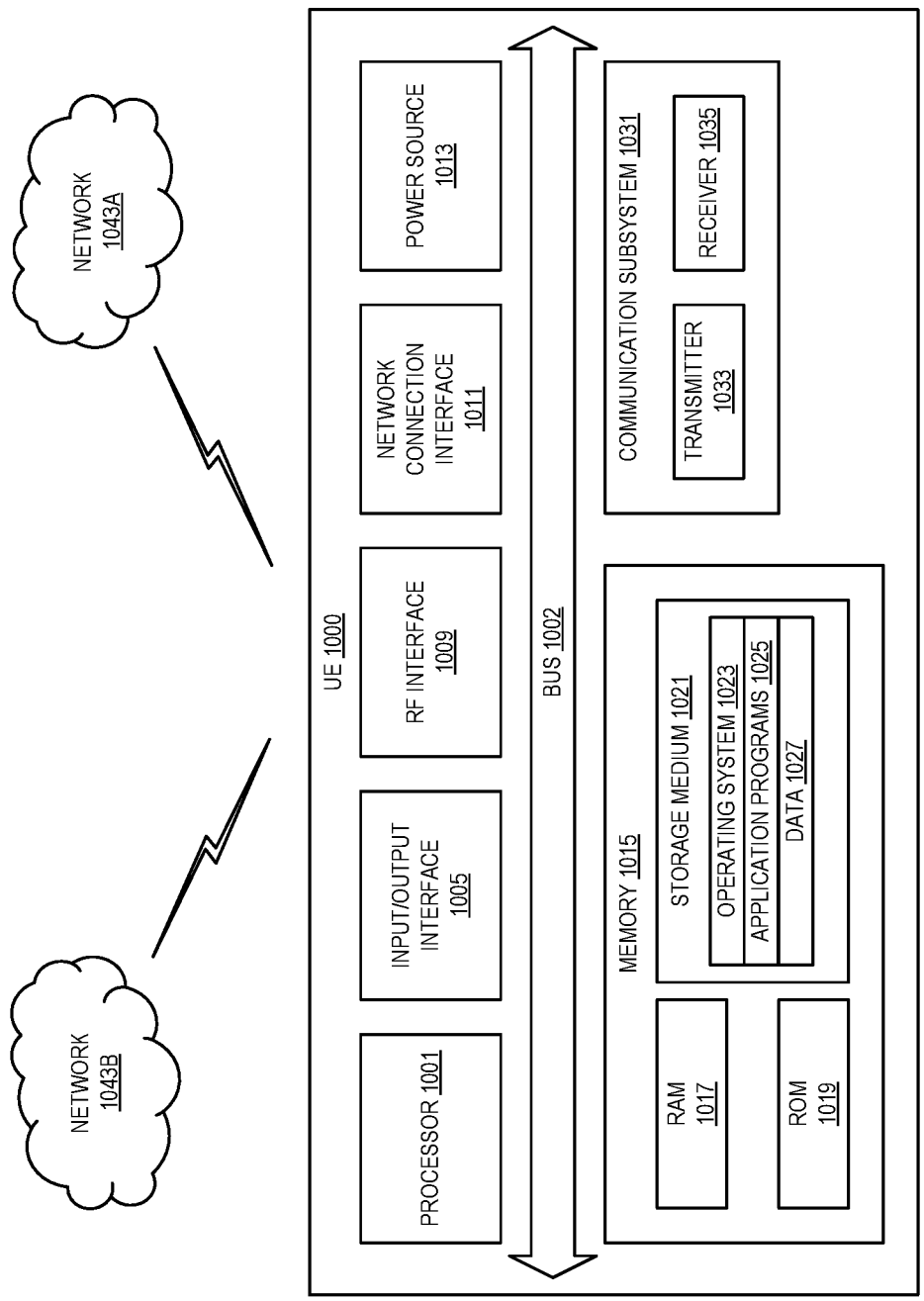
FIG. 10 illustrates one embodiment of a User Equipment (UE)

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 1000 may be any UE identified by 3GPP, including a NB-IoT UE, a MTC UE, and/or an enhanced MTC (eMTC) UE. The UE 1000, as illustrated in FIG. 10, is one example of a WD configured for communication in accordance with one or more communication standards promulgated by 3GPP, such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, the UE 1000 includes processing circuitry 1001 that is operatively coupled to an input/output interface 1005, an RF interface 1009, a network connection interface 1011, memory 1015 including RAM 1017, ROM 1019, and a storage medium 1021 or the like, a communication subsystem 1031, a power source 1013, and/or any other component, or any combination thereof. The storage medium 1021 includes an operating system 1023, an application program 1025, and data 1027. In other embodiments, the storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, the processing circuitry 1001 may be configured to process computer instructions and data. The processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 1001 may include two CPUs. Data may be information in a form suitable for use by a computer.

In the depicted embodiment, the input/output interface 1005 may be configured to provide a communication interface to an input device, output device, or input and output device. The UE 1000 may be configured to use an output device via the input/output interface 1005. An output device may use the same type of interface port as an input device. For example, a USB port may be used to provide input to and output from the UE 1000. The output device may be a speaker, a sound card, a video card, a display, a monitor, a printer, an actuator, an emitter, a smartcard, another output device, or any combination thereof. The UE 1000 may be configured to use an input device via the input/output interface 1005 to allow a user to capture information into the UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, the RF interface 1009 may be configured to provide a communication interface to RF components such as a transmitter, a receiver, and an antenna. The network connection interface 1011 may be configured to provide a communication interface to a network 1043A. The network 1043A may encompass wired and/or wireless networks such as a LAN, a WAN, a computer network, a wireless network, a telecommunications network, another like network or any combination thereof. For example, the network 1043A may comprise a WiFi network. The network connection interface 1011 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 1011 may implement receiver and transmitter functionality appropriate to the communication network links (e.g., optical, electrical, and the like). The transmitter and receiver functions may share circuit components, software, or firmware, or alternatively may be implemented separately.

The RAM 1017 may be configured to interface via a bus 1002 to the processing circuitry 1001 to provide storage or caching of data or computer instructions during the execution of software programs such as the operating system, application programs, and device drivers. The ROM 1019 may be configured to provide computer instructions or data to the processing circuitry 1001. For example, the ROM 1019 may be configured to store invariant low-level system code or data for basic system functions such as basic Input and Output (I/O), startup, or reception of keystrokes from a keyboard that are stored in a non-volatile memory. The Storage medium 1021 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 1021 may be configured to include the operating system 1023, the application program 1025 such as a web browser application, a widget or gadget engine, or another application, and the data file 1027. The storage medium 1021 may store, for use by the UE 1000, any of a variety of various operating systems or combinations of operating systems.

The storage medium 1021 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 1021 may allow the UE 1000 to access computer-executable instructions, application programs, or the like, stored on transitory or non-transitory memory media, to off-load data or to upload data. An article of manufacture, such as one utilizing a communication system, may be tangibly embodied in the storage medium 1021, which may comprise a device readable medium.

In FIG. 10, the processing circuitry 1001 may be configured to communicate with a network 1043B using the communication subsystem 1031. The network 1043A and the network 1043B may be the same network or networks or different network or networks. The communication subsystem 1031 may be configured to include one or more transceivers used to communicate with the network 1043B. For example, the communication subsystem 1031 may be configured to include one or more transceivers used to communicate with one or more remote transceivers of another device capable of wireless communication such as another WD, UE, or base station of a Radio Access Network (RAN) according to one or more communication protocols, such as IEEE 802.QQ2, Code Division Multiple Access (CDMA), WCDMA, GSM, LTE, Universal Terrestrial RAN (UTRAN), WiMax, or the like. Each transceiver may include a transmitter 1033 and/or a receiver 1035 to implement transmitter or receiver functionality, respectively, appropriate to the RAN links (e.g., frequency allocations and the like). Further, the transmitter 1033 and the receiver 1035 of each transceiver may share circuit components, software, or firmware, or alternatively may be implemented separately.

In the illustrated embodiment, the communication functions of the communication subsystem 1031 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 1031 may include cellular communication, WiFi communication, Bluetooth communication, and GPS communication. The network 1043B may encompass wired and/or wireless networks such as a LAN, a WAN, a computer network, a wireless network, a telecommunications network, another like network, or any combination thereof. For example, the network 1043B may be a cellular network, a WiFi network, and/or a near-field network. A power source 1013 may be configured to provide Alternating Current (AC) or Direct Current (DC) power to components of the UE 1000.

The features, benefits, and/or functions described herein may be implemented in one of the components of the UE 1000 or partitioned across multiple components of the UE 1000. Further, the features, benefits, and/or functions described herein may be implemented in any combination of hardware, software, or firmware. In one example, the communication subsystem 1031 may be configured to include any of the components described herein. Further, the processing circuitry 1001 may be configured to communicate with any of such components over the bus 1002. In another example, any of such components may be represented by program instructions stored in memory that, when executed by the processing circuitry 1001, perform the corresponding functions described herein. In another example, the functionality of any of such components may be partitioned between the processing circuitry 1001 and the communication subsystem 1031. In another example, the non-computationally intensive functions of any of such components may be implemented in software or firmware and the computationally intensive functions may be implemented in hardware.

Figure 11:
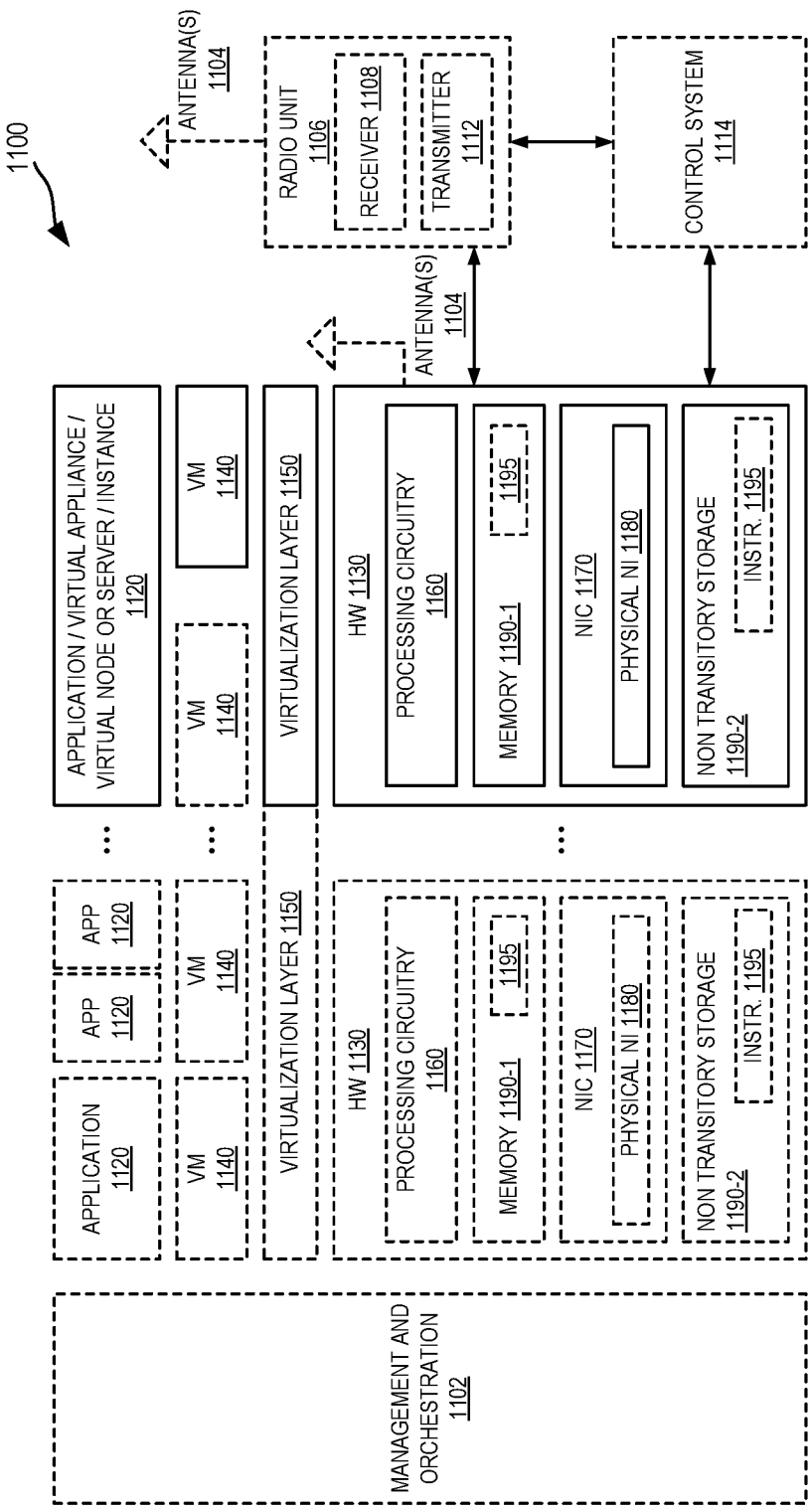
FIG. 11 is a schematic block diagram illustrating a virtualization environment in which functions implemented by some embodiments may be virtualized.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a WD, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. The applications 1120 are run in the virtualization environment 1100 which provides hardware 1130 comprising processing circuitry 1160 and memory 1190. The memory 1190 contains instructions 1195 executable by the processing circuitry 1160 whereby the application 1120 is operative to provide one or more of the features, benefits, and/or functions disclosed herein.

The virtualization environment 1100 comprises general-purpose or special-purpose network hardware devices 1130 comprising a set of one or more processors or processing circuitry 1160, which may be Commercial Off-the-Shelf (COTS) processors, dedicated ASICs, or any other type of processing circuitry including digital or analog hardware components or special purpose processors. Each hardware device 1130 may comprise memory 1190-1 which may be non-persistent memory for temporarily storing instructions 1195 or software executed by the processing circuitry 1160. Each hardware device 1130 may comprise one or more Network Interface Controllers (NICs) 1170, also known as network interface cards, which include a physical network interface 1180. Each hardware device 1130 may also include non-transitory, persistent, machine-readable storage media 1190-2 having stored therein software 1195 and/or instructions executable by the processing circuitry 1160. The software 1195 may include any type of software including software for instantiating one or more virtualization layers 1150 (also referred to as hypervisors), software to execute virtual machines 1140, as well as software allowing it to execute functions, features, and/or benefits described in relation with some embodiments described herein.

The virtual machines 1140, comprise virtual processing, virtual memory, virtual networking or interface, and virtual storage, and may be run by a corresponding virtualization layer 1150 or hypervisor. Different embodiments of the instance of virtual appliance 1120 may be implemented on one or more of the virtual machines 1140, and the implementations may be made in different ways.

During operation, the processing circuitry 1160 executes the software 1195 to instantiate the hypervisor or virtualization layer 1150, which may sometimes be referred to as a Virtual Machine Monitor (VMM). The virtualization layer 1150 may present a virtual operating platform that appears like networking hardware to the virtual machine 1140.

As shown in FIG. 11, the hardware 1130 may be a standalone network node with generic or specific components. The hardware 1130 may comprise an antenna 1104 and may implement some functions via virtualization. Alternatively, the hardware 1130 may be part of a larger cluster of hardware (e.g., such as in a data center or CPE) where many hardware nodes work together and are managed via a Management and Orchestration (MANO) 1102, which, among others, oversees lifecycle management of the applications 1120.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 1140 may be a software implementation of a physical machine that runs programs as if they were executing on a physical, non-virtualized machine. Each of the virtual machines 1140, and that part of the hardware 1130 that executes that virtual machine 1140, be it hardware dedicated to that virtual machine 1140 and/or hardware shared by that virtual machine 1140 with others of the virtual machines 1140, forms a separate Virtual Network Element (VNE).

Still in the context of NFV, Virtual Network Function (VNF) is responsible for handling specific network functions that run in one or more virtual machines 1140 on top of the hardware networking infrastructure 1130 and corresponds to the application 1120 in FIG. 11.

In some embodiments, one or more radio units 1106 that each include one or more transmitters 1112 and one or more receivers 1108 may be coupled to the one or more antennas 1104. The radio units 1106 may communicate directly with the hardware nodes 1130 via one or more appropriate network interfaces and may be used in combination with the virtual components to provide a virtual node with radio capabilities, such as a radio access node or a base station.

In some embodiments, some signaling can be effected with the use of a control system 1114, which may alternatively be used for communication between the hardware nodes 1130 and the radio unit 1106.

Figure 12:
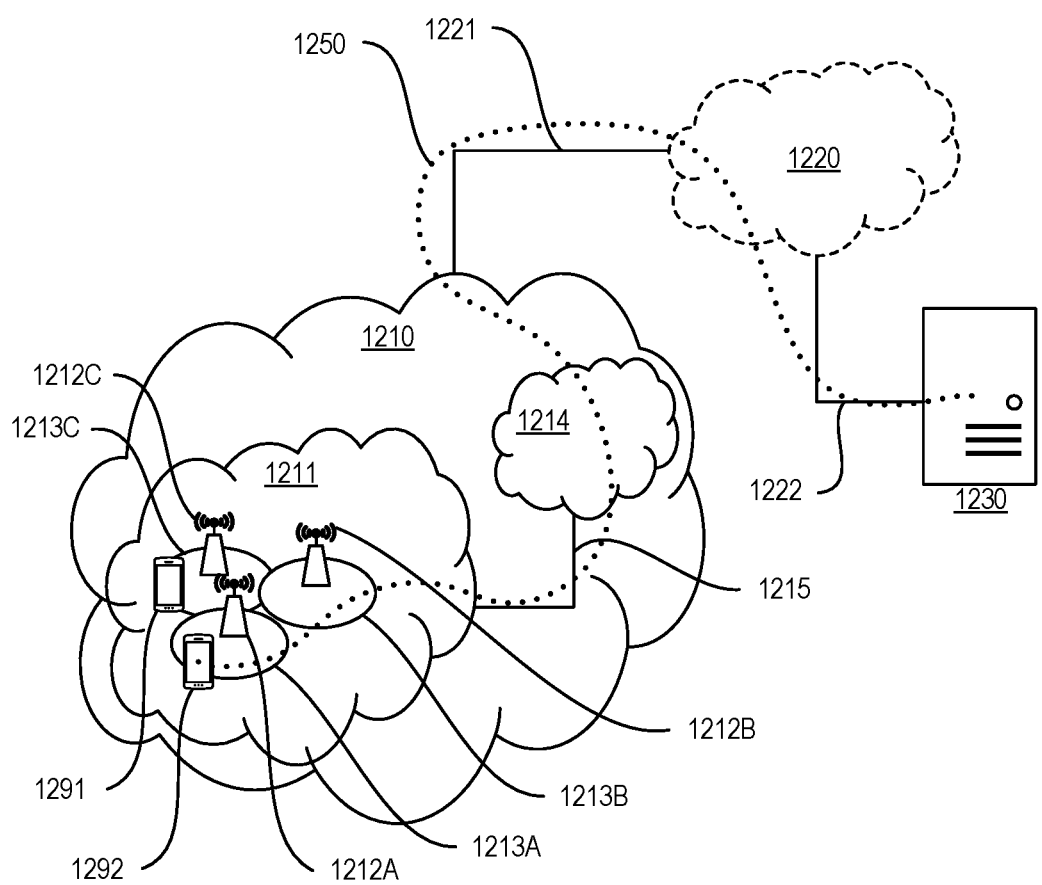
FIG. 12 illustrates a telecommunications network connected via an intermediate network to a host computer in accordance with some embodiments.

With reference to FIG. 12, in accordance with an embodiment, a communication system includes a telecommunication network 1210, such as a 3GPP-type cellular network, which comprises an access network 1211, such as a RAN, and a core network 1214. The access network 1211 comprises a plurality of base stations 1212A, 1212B, 1212C, such as NBs, eNBs, gNBs, or other types of wireless APs, each defining a corresponding coverage area 1213A, 1213B, 1213C. Each base station 1212A, 1212B, 1212C is connectable to the core network 1214 over a wired or wireless connection 1215. A first UE 1291 located in coverage area 1213C is configured to wirelessly connect to, or be paged by, the corresponding base station 1212C. A second UE 1292 in coverage area 1213A is wirelessly connectable to the corresponding base station 1212A. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server, or as processing resources in a server farm. The host computer 1230 may be under the ownership or control of a service provider, or may be operated by the service provider or on behalf of the service provider. Connections 1221 and 1222 between telecommunication network 1210 and the host computer 1230 may extend directly from the core network 1214 to the host computer 1230 or may go via an optional intermediate network 1220. The intermediate network 1220 may be one of, or a combination of more than one of, a public, private, or hosted network; the intermediate network 1220, if any, may be a backbone network or the Internet; in particular, the intermediate network 1220 may comprise two or more sub-networks (not shown).

The communication system of FIG. 12 as a whole enables connectivity between the connected UEs 1291, 1292 and the host computer 1230. The connectivity may be described as an Over-the-Top (OTT) connection 1250. The host computer 1230 and the connected UEs 1291, 1292 are configured to communicate data and/or signaling via the OTT connection 1250, using the access network 1211, the core network 1214, any intermediate network 1220, and possible further infrastructure (not shown) as intermediaries. The OTT connection 1250 may be transparent in the sense that the participating communication devices through which the OTT connection 1250 passes are unaware of routing of uplink and downlink communications. For example, the base station 1212 may not or need not be informed about the past routing of an incoming downlink communication with data originating from the host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations, in accordance with an embodiment, of the UE, base station, and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, ASICs, FPGAs, or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with the UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, ASICs, FPGAs, or combinations of these (not shown) adapted to execute instructions. The base station 1320 further has software 1321 stored internally or accessible via an external connection.

The communication system 1300 further includes the UE 1330 already referred to. The UE's 1330 hardware 1335 may include a radio interface 1337 configured to set up and maintain a wireless connection 1370 with a base station serving a coverage area in which the UE 1330 is currently located. The hardware 1335 of the UE 1330 further includes processing circuitry 1338, which may comprise one or more programmable processors, ASICs, FPGAs, or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, the executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
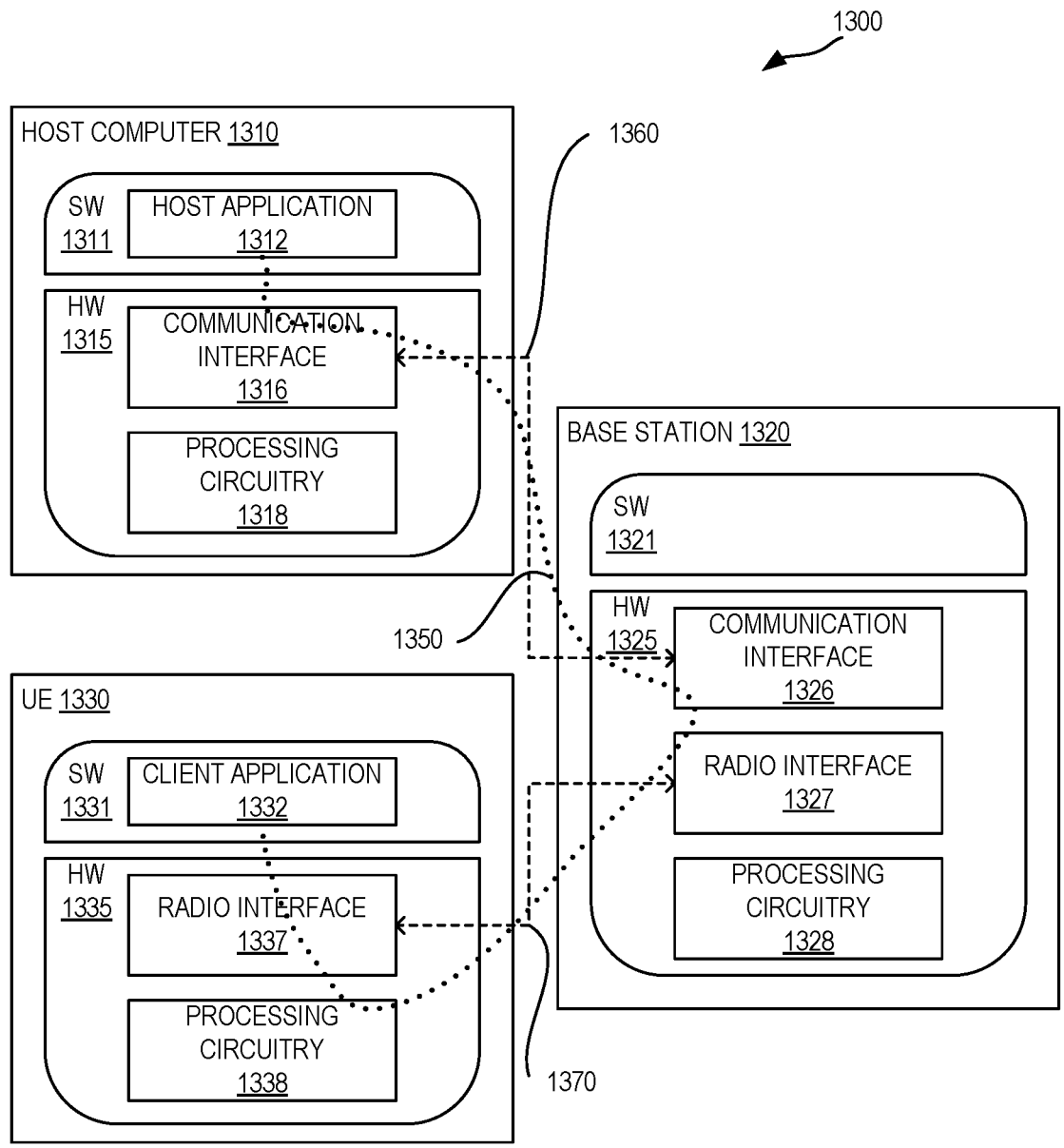
FIG. 13 illustrates a host computer communicating via a base station with a UE over a partially wireless connection in accordance with some embodiments.

It is noted that the host computer 1310, the base station 1320, and the UE 1330 illustrated in FIG. 13 may be similar or identical to the host computer 1230, one of the base stations 1212A, 1212B, 1212C, and one of the UEs 1291, 1292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the UE 1330 via the base station 1320 without explicit reference to any intermediary devices and the precise routing of messages via these devices. The network infrastructure may determine the routing, which may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1350 between the host computer 1310 and the UE 1330, in response to variations in the measurement results. The measurement procedure and/or the network functionality for reconfiguring the OTT connection 1350 may be implemented in the software 1311 and the hardware 1315 of the host computer 1310 or in the software 1331 and the hardware 1335 of the UE 1330, or both. In some embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which the software 1311, 1331 may compute or estimate the monitored quantities. The reconfiguring of the OTT connection 1350 may include message format, retransmission settings, preferred routing, etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer 1310's measurements of throughput, propagation times, latency, and the like. The measurements may be implemented in that the software 1311 and 1331 causes messages to be transmitted, in particular empty or 'dummy' messages, using the OTT connection 1350 while it monitors propagation times, errors, etc.

Figures 14, 15:
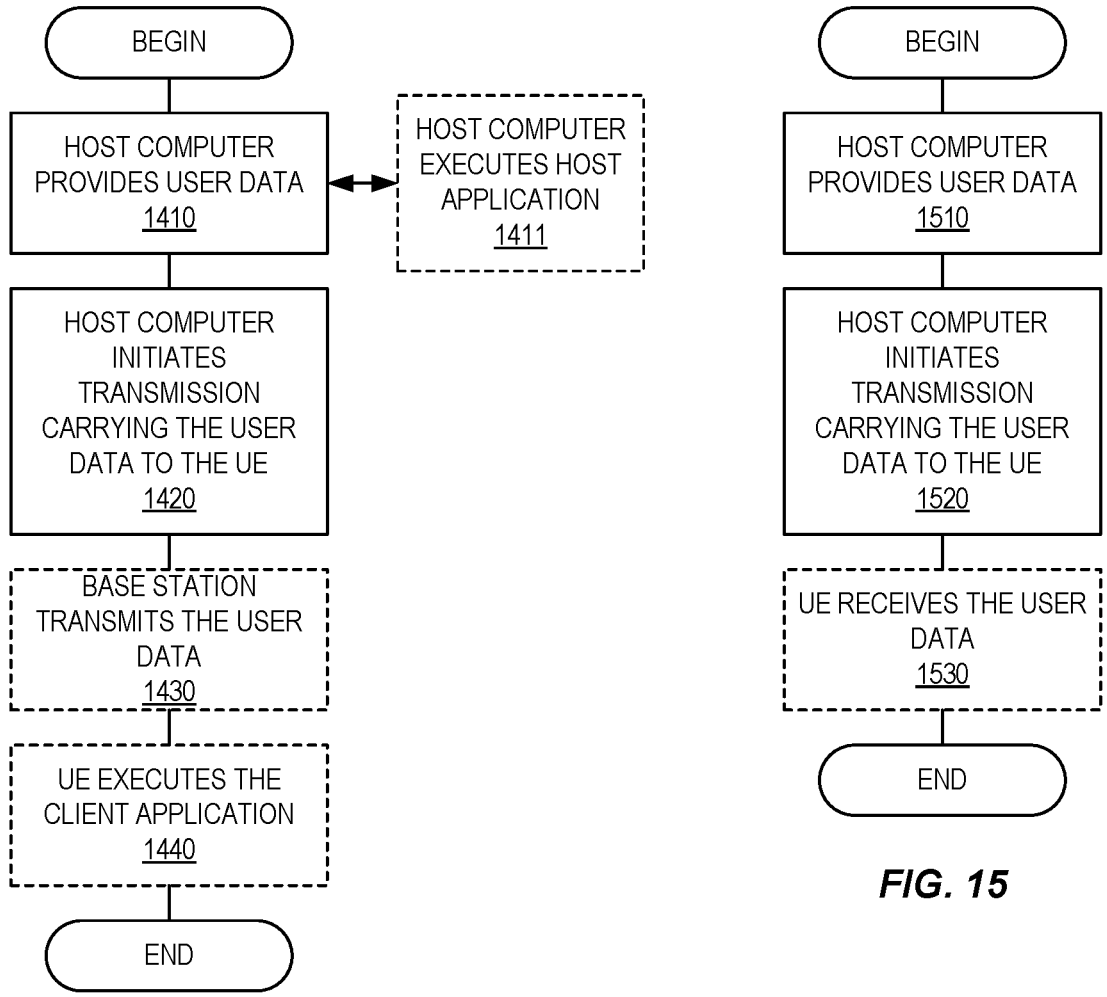
FIG. 14 is a flow chart that illustrates methods in a communication system including a host computer, a base station, and a UE in accordance with some embodiments.
FIG. 15 is a flow chart that illustrates methods in a communication system including a host computer, a base station, and a UE in accordance with some embodiments.

FIG. 14 is a flowchart illustrating a method implemented in a communication system, in accordance with one embodiment. The communication system includes a host computer, a base station, and a UE which may be those described with reference to FIGS. 14 and 13. For simplicity of the present disclosure, only drawing references to FIG. 14 will be included in this section. In step 1410, the host computer provides user data. In sub-step 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 15 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 15 will be included in this section. In step 1510 of the method, the host computer provides user data. In an optional sub-step (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

FIG. 16 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In sub-step 1621 (which may be optional) of step 1620, the UE provides the user data by executing a client application. In sub-step 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in sub-step 1630 (which may be optional), transmission of the user data to the host computer. In step 1640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Figure 18:
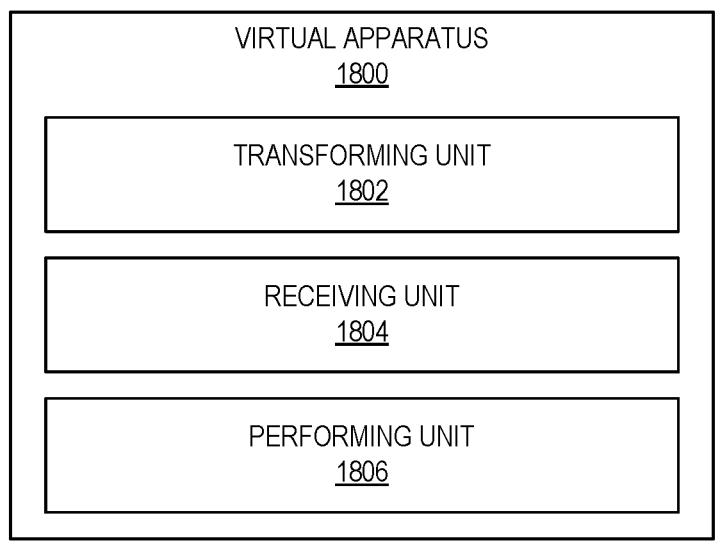
FIG. 18 illustrates a schematic block diagram of an apparatus in a wireless network.

FIG. 18 illustrates a schematic block diagram of an apparatus 1800 in a wireless network (for example, the wireless network shown in FIG. 9). The apparatus may be implemented in a wireless device or network node (e.g., the WD 910 or the network node 960 shown in FIG. 9). The apparatus 1800 is operable to carry out the example methods described with reference to FIGS. 5, 6A and 6B, and 7A and 7B and possibly any other processes or methods disclosed herein. It is also to be understood that the methods of FIGS. 5, 6A and 6B, and 7A and 7B are not necessarily carried out solely by the apparatus 1800. At least some operations of the method can be performed by one or more other entities.

The virtual apparatus 1800 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a transforming unit 1802, a receiving unit 1804, and a performing unit 1806, and any other suitable units of the apparatus 1800 to perform corresponding functions according one or more embodiments of the present disclosure.

As illustrated in FIG. 18, the apparatus 1800 includes a transforming unit 1802, a receiving unit 1804, and a performing unit 1806. The transforming unit 1802 is configured to transform a first codebook that is in a non-virtualized antenna domain to a second codebook that is in a virtualized antenna domain based on a port to antenna mapping matrix used to transform a signal from the virtualized antenna domain to the non-virtualized antenna domain prior to transmission of the signal in a corresponding virtualized cell or sector. The receiving unit 1804 is configured to receive a transmit signal from the second radio node to thereby provide a received signal. The performing unit 1806 is configured to perform PMI estimation based on the received signal using the second codebook in the virtualized antenna domain.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AAS Active Antenna System
AC Alternating Current
AP Access Point
ASIC Application Specific Integrated Circuit
ATM Asynchronous Transfer Mode
BBU Baseband Unit
BS Base Station
BSC Base Station Controller
BTS Base Transceiver Station
CD Compact Disk
CDMA Code Division Multiple Access
COTS Commercial Off-the-Shelf
CPE Customer Premise Equipment
CPU Central Processing Unit
CSI Channel State Information
CSI-RS Chanel State Information Reference Signal
D2D Device-to-Device
DAS Distributed Antenna System
DC Direct Current
DFT Discrete Fourier Transform
DIMM Dual In-Line Memory Module
DMRS Demodulation Reference Signal
DSP Digital Signal Processor
DVD Digital Video Disk
EEPROM Electrically Erasable Programmable Read Only Memory
eMTC Enhanced Machine-Type Communication
eNB Enhanced or Evolved Node B
EPROM Erasable Programmable Read Only Memory
E-SMLC Evolved Serving Mobile Location Center
FD-MIMO Full Dimension Multiple Input Multiple Output
FPGA Field Programmable Gate Array
GHz Gigahertz
gNB New Radio Base Station
GoB Grid-of-Beam
GPS Global Positioning System
GSM Global System for Mobile Communications
HDDS Holographic Digital Data Storage
HD-DVD High-Density Digital Versatile Disc
I/O Input and Output
IoT Internet of Things
IP Internet Protocol
LAN Local Area Network
LEE Laptop Embedded Equipment
LME Laptop Mounted Equipment
LTE Long Term Evolution
M2M Machine-to-Machine
MANO Management and Orchestration
MCE Multi-Cell/Multicast Coordination Entity
MDT Minimization of Drive Test
MIMO Multiple Input Multiple Output
MME Mobility Management Entity
MSC Mobile Switching Center
MSR Multi-Standard Radio
MTC Machine-Type Communication
NB-IoT Narrowband Internet of Things
NFV Network Function Virtualization
NIC Network Interface Controllers
NR New Radio
O&M Operation and Maintenance
OSS Operations Support System
OTT Over-The-Top
PDA Personal Digital Assistant
PDSCH Physical Downlink Shared Channel
PMI Precoding Matrix Indication
PROM Programmable Read Only Memory
PSTN Public Switched Telephone Network
RAID Redundant Array of Independent Disks
RAM Random Access Memory
RAN Radio Access Network
RAT Radio Access Technology
Rel Release
RF Radio Frequency
RNC Radio Network Controller
ROM Read Only Memory
RRH Remote Radio Head
RRU Remote Radio Unit
RUIM Removable User Identity
SDRAM Synchronous Dynamic Random Access Memory
SIM Subscriber Identity Module
SOC System on a Chip
SON Self-Organizing Network
SONET Synchronous Optical Networking
SRS Sounding Reference Signal
TCP Transmission Control Protocol
TDD Time Division Duplexing
TS Technical Specification
UE User Equipment
UMTS Universal Mobile Telecommunications System
USB Universal Serial Bus
UTRAN Universal Terrestrial Radio Access Network
V2I Vehicle-to-Infrastructure
V2V Vehicle-to-Vehicle V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A first radio node configured to communicate with a second radio node, the first radio node comprising:
   a radio interface; and
   processing circuitry configured to:
   transform a first codebook that is in a non-virtualized antenna domain to a second codebook that is in a virtualized antenna domain based on a port to antenna mapping matrix used to transform a signal from the virtualized antenna domain to the non-virtualized antenna domain prior to transmission of the signal in a corresponding virtualized cell or sector;
   receive a transmit signal from the second radio node to thereby provide a received signal; and
   perform Precoding Matrix Indication, PMI, estimation based on the received signal using the second codebook in the virtualized antenna domain.

2. A method of operation of a first radio node to perform Precoding Matrix Indication, PMI, estimation in a wireless communication system, comprising:
   transforming a first codebook that is in a non-virtualized antenna domain to a second codebook that is in a virtualized antenna domain based on a port to antenna mapping matrix used to transform a signal from the virtualized antenna domain to the non-virtualized antenna domain prior to transmission of the signal in a corresponding virtualized cell or sector;
   receiving a transmit signal from a second radio node to thereby provide a received signal; and
   performing PMI estimation based on the received signal using the second codebook in the virtualized antenna domain.

3. The method of claim 2, wherein performing PMI estimation comprises:
   transforming the received signal from the non-virtualized antenna domain to the virtualized antenna domain based on the port to antenna mapping matrix to provide a virtualized antenna domain received signal; and
   performing PMI estimation based on the virtualized antenna domain received signal.

4. The method of claim 2, wherein transforming the first codebook that is in the non-virtualized antenna domain to the second codebook that is in the virtualized antenna domain based on the port to antenna mapping matrix comprises transforming the first codebook that is in the non-virtualized antenna domain to the second codebook that is in the virtualized antenna domain in accordance with:

$B_b = f(B_a, W_{p2a})$ where:
   $B_b$ is the second codebook that is in the virtualized antenna domain;
   $B_a$ is the first codebook that is in the non-virtualized antenna domain; and
   $W_{p2a}$ is the port to antenna mapping matrix.

5. The method of claim 2, wherein transforming the first codebook that is in the non-virtualized antenna domain to the second codebook that is in the virtualized antenna domain based on the port to antenna mapping matrix comprises transforming the first codebook that is in the non-virtualized antenna domain to the second codebook that is in the virtualized antenna domain in accordance with: $B_b = (W_{p2a}^H W_{p2a})^{-1} W_{p2a}^H B_a$, $B_b = W_{p2a}^H B_a$, or $B_b = W_{p2a}^{-1} B_a$,
where:
   $B_b$ is the second codebook that is in the virtualized antenna domain;
   $B_a$ is the first codebook that is in the non-virtualized antenna domain;
   $W_{p2a}$ is the port to antenna mapping matrix; and
   superscript H denotes Hermitian transpose.

6. The method of claim 2, wherein the first radio node is a wireless device, the second radio node is a radio access node, and the port to antenna mapping matrix is used by the radio access node to transform the signal from the virtualized antenna domain to the non-virtualized antenna domain prior to transmission by the radio access node in the corresponding virtualized cell or sector.

7. The method of claim 6, wherein:
   performing PMI estimation based on the received signal using the second codebook in the virtualized antenna domain comprises selecting a precoding matrix from the second codebook; and
   the method further comprises reporting an indication of the precoding matrix to the second radio node.

8. The method of claim 7, wherein selecting the precoding matrix from the second codebook comprises selecting the precoding matrix from the second codebook in accordance with:

$$w_b = \operatorname*{argmax}_{w_b \in B_b} w_b^H R_b w_b$$

where
   $w_b$ is the selected precoding matrix;
   $B_b$ is the second codebook;
   $R_b$ is defined as $R_b = E[H_b^H H_b]$;
   $H_b$ is an effective downlink channel matrix for an effective downlink channel in the virtualized antenna domain observed by the wireless device with reference signal, where $H_b$ is defined as:

$H_b = H_{DL} W_{p2a}$;

$H_{DL}$ is an actual downlink channel matrix that defines an actual downlink channel between the radio access node and the wireless device;
   $W_{p2a}$ is the port to antenna mapping matrix; and
   superscript H denotes Hermitian transpose.

9. The method of claim 6, wherein performing PMI estimation comprises applying a codebook restriction for the first codebook to the second codebook.

10. The method of claim 2, wherein the first radio node is a radio access node, the second radio node is a wireless device, and the port to antenna mapping matrix is used by the radio access node to transform the reference signal from the virtualized antenna domain to the non-virtualized antenna domain prior to transmission by the radio access node in the corresponding virtualized cell or sector.

11. The method of claim 10, wherein:
performing PMI estimation based on the received signal using the second codebook in the virtualized antenna domain comprises selecting a precoding matrix from the second codebook.

12. The method of claim 11, further comprising providing an indication of the precoding matrix to the second radio node.

13. The method of claim 11, wherein selecting the precoding matrix from the second codebook comprises selecting the precoding matrix from the second codebook in accordance with:

$$w_b = \underset{w_b \in B_b}{\mathrm{argmax}}\, w_b^H R_b w_b$$

where
- $w_b$ is the selected precoding matrix;
- $B_b$ is the second codebook;
- $R_b$ is defined as $R_b = E[H_b^H H_b]$;
- $H_b$ is an effective downlink channel matrix in the virtualized antenna domain estimated by the first radio node, where $H_b$ is defined as:

$$H_b = (W_{p2a}^T H_{UL})^T;$$

- $H_{UL}$ is an actual uplink channel matrix in the non-virtualized antenna domain that defines an actual uplink channel between the radio access node and the wireless device;
- $W_{p2a}$ is the port to antenna mapping matrix; and
- superscript H denotes Hermitian transpose.

14. The method of claim 2, wherein the port to antenna mapping matrix is predefined for the corresponding virtualized cell or sector.

15. The method of claim 2, wherein:
the first radio node is a wireless device;
the second radio node is a radio access node; and
the method further comprises:
selecting, at the first radio node, the port to antenna mapping matrix from a predefined set of possible port to antenna matrices based on one or more precoded beam reference signals transmitted by the second radio node; and
sending an indication of the port to antenna mapping matrix to the second radio node.

16. The method of claim 2, wherein:
the first radio node is a radio access node;
the second radio node is a wireless device; and
the method further comprises receiving an indication of the port to antenna mapping matrix from the second radio node.

17. The method of claim 2, wherein:
the first radio node is a wireless device;
the second radio node is a radio access node; and
the method further comprises receiving an indication of the port to antenna mapping matrix from the second radio node.

18. The method of claim 2, wherein:
the first radio node is a radio access node;
the second radio node is a wireless device; and
the method further comprises:
determining the port to antenna mapping matrix at the first radio node based on one or more uplink reference signals received from the second radio node; and
sending an indication of the port to antenna mapping matrix to the second radio node.

19. The method of claim 2, wherein the first codebook that is in the non-virtualized antenna domain is defined as:

$$B_a = B_h \otimes B_v$$

where $B_h$ is a non-virtualized antenna domain codebook for a horizontal direction and $B_v$ is a non-virtualized antenna domain codebook for a vertical direction.

20. The method of claim 19, wherein $B_h$ and $B_v$ are both Grid-of-Beam, GoB, codebooks.

21. The method of claim 2, wherein the first codebook that is in the non-virtualized antenna domain is defined as:

$$B_a = B_p \otimes B_h \otimes B_v$$

where $B_h$ is a non-virtualized antenna domain codebook for a horizontal direction, $B_v$ is a non-virtualized antenna domain codebook for a vertical direction, and $B_p$ is a non-virtualized antenna domain codebook for co-phasing cross polarizations.

22. The method of claim 21, wherein $B_h$, $B_v$, and $B_p$ are Grid-of-Beam, GoB, codebooks.

23. A method of operation of a node associated with a first radio node to perform Precoding Matrix Indication, PMI, estimation in a wireless communication system, comprising:
performing PMI estimation based on a received signal using a transformed codebook in a virtualized antenna domain, wherein:
the transformed codebook is a version of a first codebook in a non-virtualized antenna domain that is transformed into a virtualized antenna domain based on a port to antenna mapping matrix used to transform a signal from the virtualized antenna domain to the non-virtualized antenna domain prior to transmission of the signal in a corresponding virtualized cell or sector; and
the received signal is a transformed version of a signal transmitted from a second radio node and received by the first radio node that is transformed based on the port to antenna mapping matrix.

24. The method of claim 23, wherein the transformed version of the signal transmitted from the second radio node and received by the first radio node is transformed based on $W_{p2a}^T$, where $W_{p2a}$ is the port to antenna mapping matrix.

* * * * *